United States Patent [19]
Lam et al.

[11] Patent Number: 5,940,429
[45] Date of Patent: Aug. 17, 1999

[54] CROSS-TERM COMPENSATION POWER ADJUSTMENT OF EMBEDDED AUXILIARY DATA IN A PRIMARY DATA SIGNAL

[75] Inventors: S. Katherine Lam; Chong U. Lee, both of San Diego, Calif.

[73] Assignee: Solana Technology Development Corporation, San Diego, Calif.

[21] Appl. No.: 08/805,732

[22] Filed: Feb. 25, 1997

[51] Int. Cl.[6] ................................ H04K 1/10
[52] U.S. Cl. .................. 375/200; 375/208; 375/285; 375/296; 370/527; 370/529; 455/105
[58] Field of Search .................... 375/200, 206, 375/208, 209, 210, 285, 296; 370/203, 208, 209, 320, 335, 342, 441, 479, 522, 527, 529; 455/105, 116

[56] References Cited

U.S. PATENT DOCUMENTS

| | | | |
|---|---|---|---|
| 3,845,391 | 10/1974 | Crosby | 455/39 |
| 4,079,419 | 3/1978 | Siegle et al. | 348/732 |
| 4,313,197 | 1/1982 | Maxemchuk | 370/210 |
| 4,425,661 | 1/1984 | Moses et al. | 375/200 |
| 4,534,054 | 8/1985 | Maisel | 381/4 |
| 5,103,459 | 4/1992 | Gilhousen et al. | 370/209 |
| 5,113,437 | 5/1992 | Best et al. | 380/3 |
| 5,319,735 | 6/1994 | Preuss et al. | 704/205 |
| 5,379,345 | 1/1995 | Greenberg | 380/23 |
| 5,404,377 | 4/1995 | Moses | 375/200 |
| 5,450,490 | 9/1995 | Jensen et al. | 380/6 |
| 5,461,610 | 10/1995 | Weerackody | 370/342 |
| 5,500,856 | 3/1996 | Nagase et al. | 370/441 |
| 5,696,789 | 12/1997 | Jones et al. | 375/200 |

*Primary Examiner*—Amanda Le
*Attorney, Agent, or Firm*—Barry R. Lipsitz; Ralph F. Hoppin

[57] ABSTRACT

An auxiliary data signal is transported with a primary data signal by hiding the auxiliary data signal in the form of colored noise. The colored noise has a spectrum that simulates the spectrum of the primary data signal. By adjusting the gain of individual spread spectrum signal carrier(s) and the power of the colored noise, the auxiliary information stream(s) can be rendered at any desired level below or above an interference threshold in the primary data signal. The power of the colored noise is further compensated to account for a cross-correlation between the primary data signal and the auxiliary data signal to enhance the recovery of the auxiliary data at a decoder.

52 Claims, 18 Drawing Sheets

5,940,429

CROSS-TERM COMPENSATION POWER ADJUSTMENT OF EMBEDDED AUXILIARY DATA IN A PRIMARY DATA SIGNAL

BACKGROUND OF THE INVENTION

The present invention relates to a method and apparatus for embedding (e.g., hiding) data in a primary or host data signal, and more particularly to a scheme for inserting one or more auxiliary data signals into a primary data signal being communicated over existing channels. The embedded data signal is power-adjusted according to the power level of the primary data signal and a cross-correlation between the primary data signal and the embedded data signal. The primary data signal may include an electromagnetic or acoustic signal, for example, which provides an analog or digital representation of the data. Methods and apparatus for recovering the embedded data from the primary data signal are also disclosed, along with specific applications of the invention.

The capacity of a transmission channel to carry information is limited by the bandwidth of the channel. Since the bandwidth of wireless communication channels is limited, techniques have been developed for increasing the amount of information that can be carried within a channel of a given bandwidth. For example, techniques for compressing digital data to squeeze more data within a given bandwidth or data storage space are well known.

Another approach to communicating additional data within a given bandwidth is to identify areas where supplemental information can be transported with a primary signal, without adversely affecting the transport of the primary signal itself. Such techniques can be used in combination with known compression methods. One such technique is the transport of data together with a primary data signal, where the bandwidth of the channel remains as is, and additional information is packed with the primary data such that the additional information can be retrieved without substantially degrading the quality of the primary data signal.

A primary electromagnetic (EM) signal may include frequency components which are below the audible range (e.g., 0.5 to 20 Hz), in the audible range (e.g., 20 Hz to 20,000 Hz), and above the audible range (e.g., above 20,000 Hz). So-called long wave signals have frequency components from approximately 0.1 Hz to 0.1 MHz. Radio wave signals have frequency components from approximately 1 MHz to 1 GHz, and include the amplitude modulation (AM) band, amateur radio band, frequency modulation (FM) band and television band. Microwave signals have frequency components from 1 GHz to 1 TeraHertz (THz). The EM spectrum extends further to the infrared, visible light, ultraviolet, x-ray and gamma ray ranges.

One method for embedding digital information in a primary data signal such as an audio signal is disclosed in U.S. Pat. No. 5,319,735 entitled "Embedded Signalling." This patent discloses the generation of a code signal representing a sequence of code symbols to be embedded, the code signal having frequency components essentially confined to a preselected signalling band lying within and less than the bandwidth of the audio signal. The audio signal is continuously frequency analyzed over a frequency band encompassing the signalling band. The code signal is dynamically filtered as a function of the analysis to provide a modified code signal with frequency component levels which, at each time instant, are essentially negligibly small outside the signalling band. At each frequency within the signalling band, the frequency component levels of the modified code signal are essentially a preselected proportion of the levels of the audio signal frequency components in a corresponding frequency range. The modified code signal is combined with the audio signal to provide a composite audio signal. The frequency analysis and dynamic filtering is accomplished using a large bank of bandpass filters, which leads to a rather complicated and expensive implementation that may have limited practical value.

It would be advantageous to provide a more robust scheme for hiding data in a primary data signal which has frequency components below, in, and/or above the audible range. Such a scheme should enable a plurality of different data streams to be carried with the primary data signal without substantially altering the quality of the primary data signal, where different data streams may be provided at different data rates and combined in any number of ways prior to being added to the primary data signal. Different data streams or combinations thereof should also be able to be added to the primary data signal in a "cascade" approach after other streams have already been added to the primary data signal. The combined data streams should be able to be provided at different levels (i.e., with different gains) in the primary data signal, and the power of the combined streams should be adjustable to maintain the combination at a desired level within the primary data signal.

Further, the type of information carried by the primary data signal should be virtually unlimited. For example, it would be advantageous to allow data that is completely unrelated to the primary data signal to be carried. Similarly, it would be advantageous to enable data ancillary to the primary data to be carried, such as data for effecting a copy protection scheme which precludes the primary data signal from being copied without proper authorization, or for otherwise controlling the use of the program or other information (e.g., video or multimedia) which is associated with the primary data signal. Information identifying the content of the primary data signal, such as the name and/or performers of an audio or video program, and polling information for market research or commercial verification might also be hidden using such a scheme. Further, the scheme should allow the hiding of either a modulated carrier, an unmodulated carrier (e.g., pilot), or a combination of both in the primary data signal.

The present invention relates to methods and apparatus for transporting and recovering information hidden in a primary data signal having the aforementioned and other advantages.

SUMMARY OF THE PRESENT INVENTION

In accordance with the present invention, a method for adjusting the power of an auxiliary data signal which is carried with a primary data signal, includes the step of providing a cross-term compensation (CTC) signal which is indicative of a cross-correlation between the auxiliary data signal and the primary data signal. The power of the auxiliary data signal is adjusted according to the cross-term compensation signal.

The CTC signal may be limited to a predetermined range. Moreover, the power of the auxiliary data signal may be adjusted according to the average amplitude of the primary data signal, and may further be floor-limited. That is, the minimum power adjustment may be limited to a non-zero value.

In a particular embodiment, the average amplitude of the primary data signal is determined. Then, a desired signalto-noise ratio of the auxiliary information signal in the primary data signal is determined, and the power of the auxiliary data signal is adjusted according to a product of the average amplitude and the desired signal-to-noise ratio. The magnitude of the cross-term compensation signal may be limited to a magnitude of the product of the average amplitude and the desired signal-to-noise ratio.

In an optional embodiment, the auxiliary information signal is obtained by modulating a pseudorandom noise carrier by auxiliary information to provide a spread spectrum signal carrying the information on a carrier portion.

The auxiliary data signal may be modulated according to a binary phase-shift keying (BPSK) technique. Additionally, the auxiliary data signal may be spectrally shaped according to a spectral shape of the primary data signal.

In case the primary data signal comprises audio data, the auxiliary data signal may be carried substantially inaudibly in the primary data signal.

A corresponding apparatus is also presented.

BRIEF DESCRIPTION OF THE DRAWINGS

FIG. 5($b$) is a block diagram of another embodiment of an LPC hidden data transport encoder providing spectral shaping and power adjustment of the auxiliary information to be hidden in the primary data signal;

FIG. 5($c$) is a block diagram of a power control function for use with the encoder of FIG. 5($b$);

FIG. 13($b$) illustrates a cross-correlation vector in a BPSK signal space;

FIG. 13($c$) illustrates actual binary phase-shift keying (BPSK) vectors with an additive or subtractive cross-correlation vector in a BPSK signal space;

FIG. 14($b$) is a block diagram of a power control function with full cross term compensation for use with the encoder of FIG. 14($a$); and FIG. 14($c$) is a block diagram of a power control function with limited cross term compensation for use with the encoder of FIG. 14($a$).

DETAILED DESCRIPTION OF THE INVENTION

Figure 1:
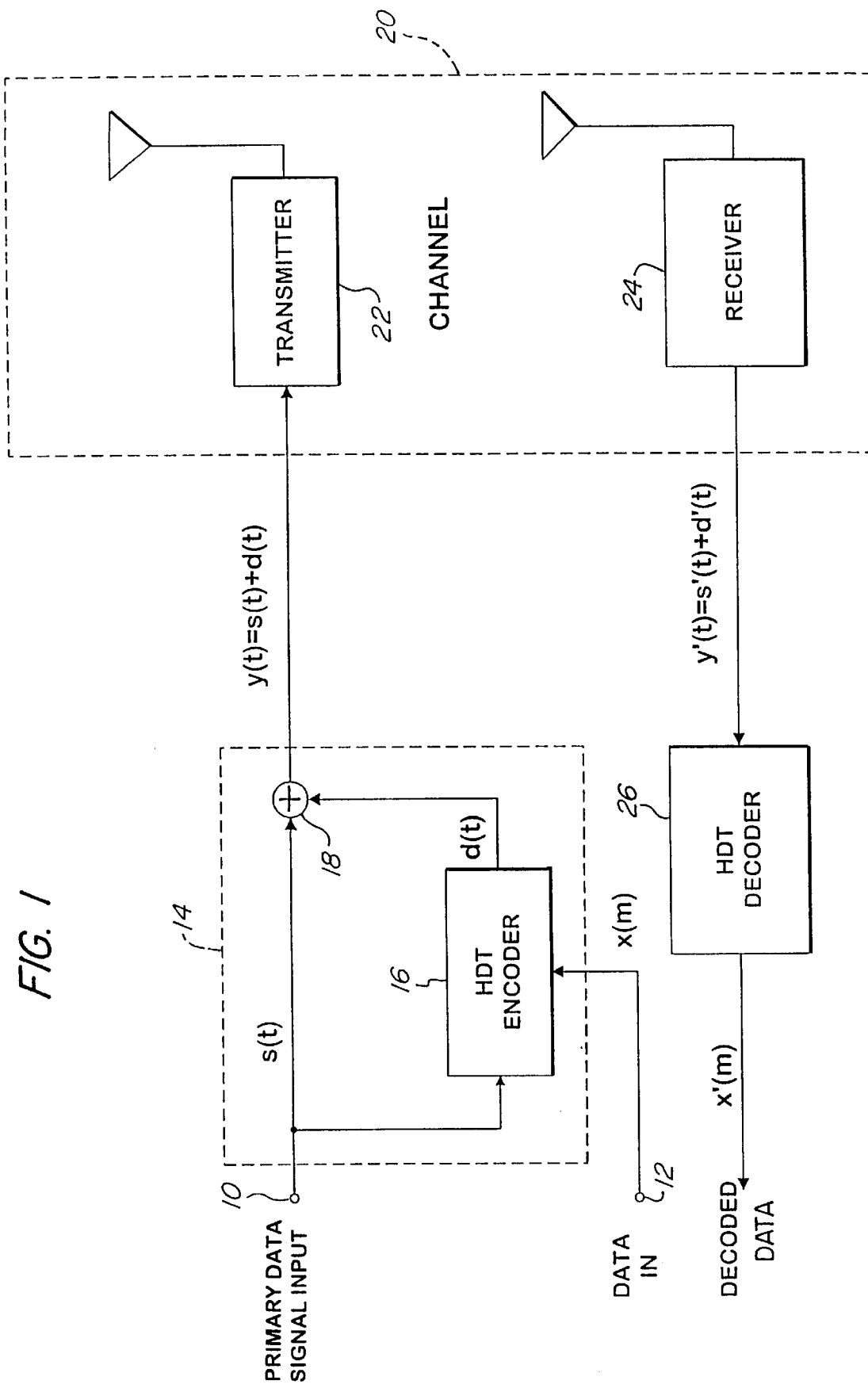
FIG. 1 is a high-level block diagram of the hidden data transport system of the present invention.

The present invention creates a hidden channel within a physical channel designed to carry a primary data signal without interfering unacceptably with the primary data signal. The subsequent modulation of the primary data signal for transmission is relatively irrelevant. Well known AM, FM, and multilevel modulation techniques such as binary phase-shift keying (BPSK), quadrature phase-shift keying (QPSK), quadrature amplitude modulation (QAM), and other known modulation techniques can be used to transmit the primary data signal after it has been processed in accordance with the present invention to carry hidden auxiliary information.

The auxiliary information can comprise any desired data which may or may not have a relationship with the primary data signal. For example, text data, control data, and other unrelated data can be carried in a primary data signal. In addition, or alternatively, data identifying the primary data signal and/or its content, market research and commercial verification data, as well as copy protection data can be carried using the techniques of the present invention.

It should be appreciated that the present invention is not limited in any way as to the type of data that can be hidden or otherwise carried in the primary data signal, nor is the invention limited to the type of primary data signal used. That is, the primary data signal may include an electromagnetic signal having frequency components which are below, in, and/or above the audible range. The invention may also be extended for use with acoustic waves.

The best kind of signal to use as the carrier for the auxiliary information to be hidden is a random noise-like signal. Random noise is easier to tolerate than correlated noise.

Pseudorandom noise is typically used in a spread spectrum communication system. Such a system is used in accordance with the present invention in order to reliably transmit data at a desired signal to noise ratio (SNR) of, for example, −40 dB. A high processing gain, i.e., ratio between signal bandwidth and signalling rate, is needed to overcome a low SNR. Therefore, in a typical spread spectrum system the information rate is very low, typically over 100 bits per second over a 6 MHz bandwidth video channel. A pseudorandom (PN) carrier used in a spread spectrum system has a wide band spectrum. Thus, the required SNR is difficult to maintain at the spectral valleys unless the processing gain is much higher. In order to overcome this problem, the present invention adaptively shapes the PN spectrum to match that of the spectrum of the primary data signal. This technique enables auxiliary information to be hidden in a primary data signal at reasonably high data rates.

Adaptive shaping of the PN spectrum in accordance with the present invention to generate a "colored noise" carrier signal can be achieved, for example, by passing white PN noise through a linear predictive coding (LPC) filter that is derived from the primary data signal in which data is to be hidden. The PN noise sequence serves as the carrier signal that is shaped by an LPC filter to dynamically match the spectrum of the primary data signal. Advantageously, the nearly perfect inverse LPC filter can be computed at a receiver since the injected noise signal itself will have a similar spectral shape as the primary data signal.

A benefit of employing an LPC filter is the flattening or "whitening" effect of the interfering signal, in this case the primary data signal. The linear prediction process removes the predictable part of the signal such that the prediction residual has a relatively flat spectrum. This type of noise significantly improves the performance of forward error correction (FEC) coding that will typically be provided for the auxiliary information in order to reduce the probability of errors at the receiver.

Another benefit of an LPC embodiment is that transmission channel distortion can also be compensated for by the LPC filter through the whitening process. In effect, the inverse LPC filter at the receiver acts as an automatic equalizer for the combined filter formed by the transmit LPC filter and the channel filter. A further benefit of LPC is that it provides a prediction gain useful, for example, in reducing the power of the primary data signal.

Alternative embodiments are disclosed in which subband coding is used instead of the time domain modelling and synthesis provided by LPC. In order to implement the invention using subband coding, fast Fourier transform (FFT) techniques can be used.

FIG. 1 illustrates the hidden data transport (HDT) system of the present invention in simplified form. A primary data signal is input via terminal 10 to an encoder 14 that includes an HDT encoder 16 and a summing circuit 18. The HDT encoder 16 receives via terminal 12 auxiliary data that is to be hidden in the primary data signal.

The primary data signal s(t) is analyzed by the HDT encoder 16 to determine the spectral shaping requirement. The auxiliary data x(m) input via terminal 12 is modulated to produce a colored noise signal d(t) which is then added to the primary data signal s(t) in summer 18 before transmission. The signal power of d(t) is adjusted to be a small fraction of the power in s(t). The combined signal y(t)=s(t)+d(t) is transmitted via a transmitter 22 over a channel generally designated 20. The transmitter may modulate s(t) onto a carrier such as a sine wave. Moreover, although a wireless channel is illustrated in FIG. 1, it should be appreciated that a wired channel (e.g., electrically conductive cable or fiber optic cable) can also be used. The invention is also applicable to recorded electromagnetic signals (e.g., on magnetic or optical media or the like, such as tapes and compact discs and the like).

A receiver 24 produces a replica of the transmitted signal, denoted y'(t)=s'(t)+d'(t). The receiver may include a demodulator if s(t) was modulator onto a carrier at a transmitter. Since the primary data signal s'(t) masks the auxiliary data, the auxiliary data d'(t) is hidden and does not interfere with the primary data signal. For example, if the primary data signal includes audio components, users listening to the signal will hear normal audio s'(t) and will not perceive the presence of d'(t). For non-audio components in the primary data signal, a threshold level of acceptable interference may be determined for the specific application and defined by a signal-to-noise ratio, for example. This threshold level may be determined based on qualitative and/or quantitative criteria. For example, for a satellite transmission, an acceptable interference level may be measured according to a signal acquisition time or error rate. For an analog television transmission, an acceptable interference level may be measured according to the video image quality. HDT decoder 26 will recover the auxiliary digital signal x(m) as x'(m) from the received signal y'(t).

Transmitter 22, receiver 24 and the propagation medium through which they communicate are collectively referred to as the channel 20. This channel can be virtually anything capable of carrying a primary data signal, using any form of analog or digital transmission. Further, the transmission may be in a compressed or uncompressed format. Examples are AM or FM broadcasting, satellite transmission, cellular phone and other mobile radio transmissions, cable television, cassette tape, compact disc, the Internet, computer networks, telephone networks and the like.

Figure 2:
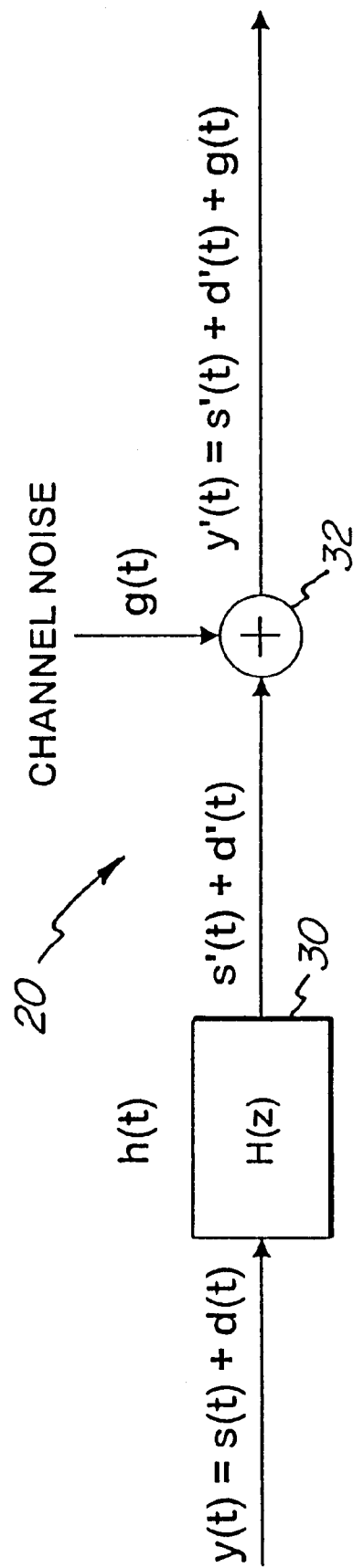
FIG. 2 is a block diagram illustrating a model of a typical transmission channel.

FIG. 2 is a model of the transmission channel 20. The channel is simply modeled in this example by a linear channel filter 30 (H(z)), with an additive noise g(t) referred to as "channel noise." In the illustrative embodiment of FIG. 2, the channel noise is added to the output of the linear channel filter 30 via an adder 32. It will be appreciated that the channel may be non-linear.

The channel filter H(z) is expected to have a nominal low pass characteristic with a sufficiently wide bandwidth to pass the primary data signal with a good quality. The output of the transmission channel is y'(t)=s'(t)+d'(t)+g(t). The components s'(t) and d'(t) are the responses of the channel to the input s(t) and d(t), respectively.

Figure 3:
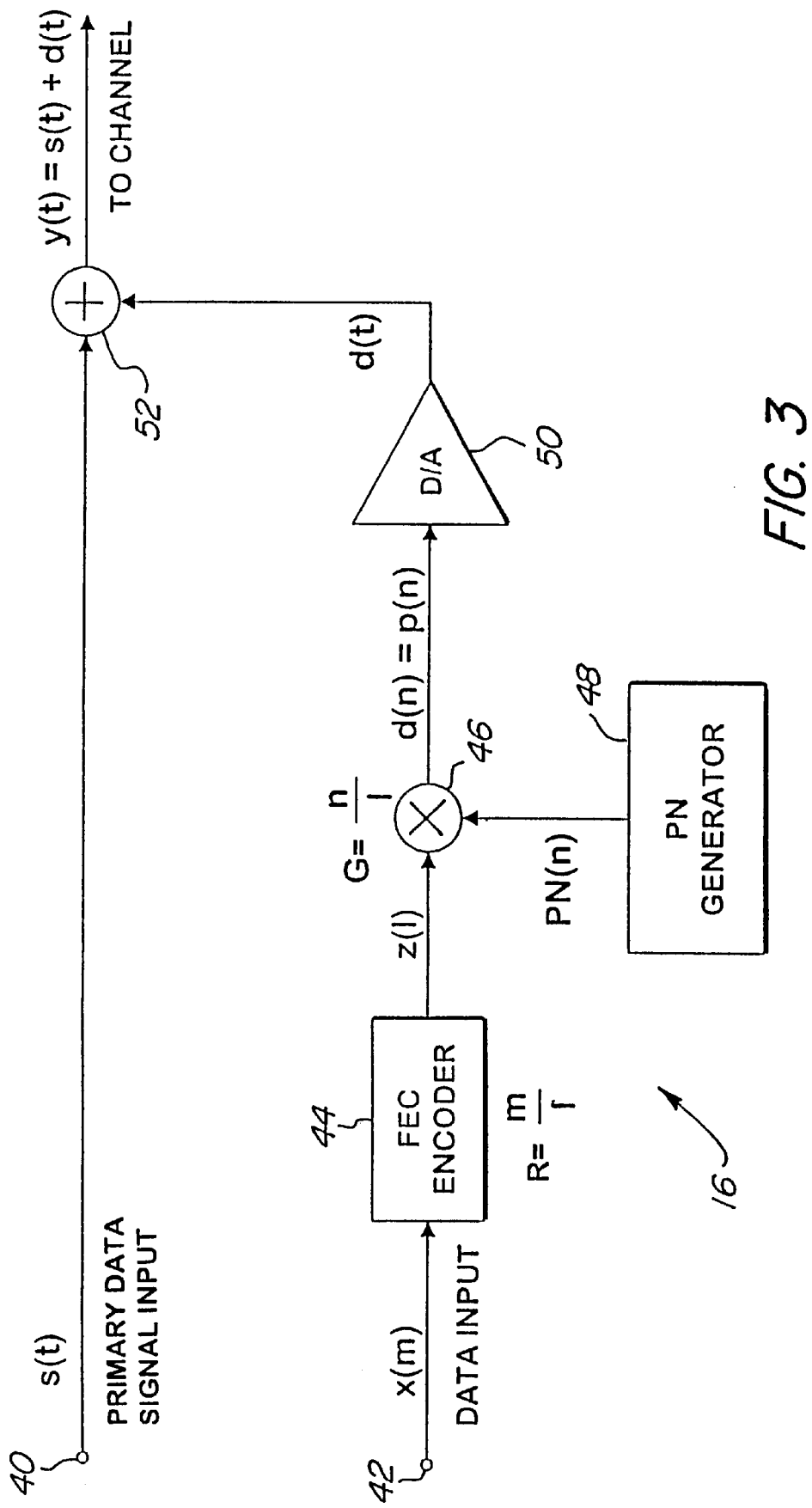
FIG. 3 is a block diagram of a basic white noise hidden data transport encoder.

FIG. 3 illustrates a basic white noise HDT encoder that allows auxiliary information to be carried on a primary data signal as uncolored noise (i.e., without spectral shaping of the spread spectrum carrier). The use of uncolored noise to carry the auxiliary information provides a lower performance than can be obtained using colored noise, as described in more detail below in connection with FIGS. 5(a) and 6. However, a basic encoder as illustrated in FIG. 3 provides a simple and straightforward implementation.

The encoder 16 of FIG. 3 receives the primary data signal input s(t) via terminal 40. This input is added to the auxiliary information, which is in the form of a spread spectrum signal, via a summing circuit 52. It should be appreciated that the primary data signal input can be combined with the spread spectrum signal carrying the auxiliary information using any known signal combining circuit.

The auxiliary information to be transported with the primary data signal is input via terminal 42 to a forward error correcting (FEC) encoder 44. Such FEC encoders are well known in the art. The FEC encoded data is then multiplied with a pseudorandom noise sequence output from a conventional pseudorandom sequence generator 48 via a multiplier 46. The PN generator 48 can be based, for example, on a feedback shift register circuit or other well known key and generator circuit. The output of the generator PN(n) may, for example, take on values of either +1 or −1. In this example, the long-term power spectrum of PN(n) is flat (i.e., "white"), although the present invention may be adapted for use when PN(n) is not flat.

The output of multiplier 46 is a modulated PN sequence p(n). Normally, the sampling rate or "chip rate" of PN(n) is much higher than the symbol rate of the output z(l) of FEC encoder 44. Thus, G>>1, where G=n/1 is the processing gain ("spreading ratio"). The signal processing from x(m) to p(n) illustrated in FIG. 3 comprises conventional direct sequence spread spectrum modulation.

Figure 4:
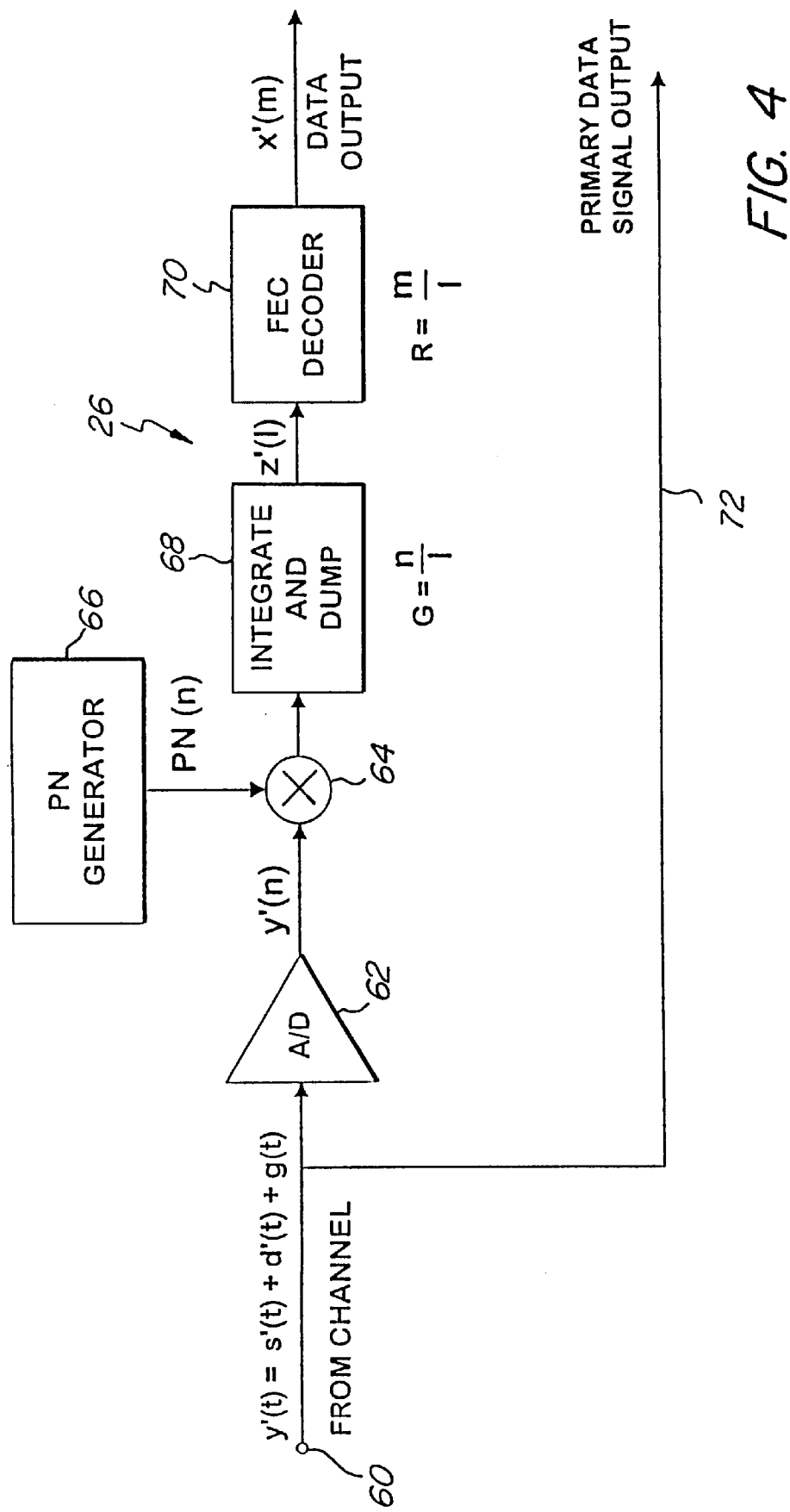
FIG. 4 is a block diagram of a basic white noise hidden data transport decoder.

The modulated PN sequence p(n) is input to a digital-to-analog (D/A) converter 50, that converts the signal to its analog form d(t) for combination with the primary data signal, which is then communicated over a channel to the encoder of FIG. 4.

FIG. 4 illustrates a decoder wherein the primary data signal carrying the auxiliary information is input via a terminal 60 to an analog-to-digital (A/D) converter 62. The primary data signal is also directly output via line 72 to conventional processing circuitry which may include a demodulator, filter, amplifier, and the like (not shown). The noise containing the auxiliary information is at a level in the output primary data signal which is low enough to avoid interfering with the primary data signal. Thus, the auxiliary information is "hidden" in the primary data signal; it is there, but it will not interfere with conventional processing of the primary data signal. For instance, if the primary data signal includes audio components, the auxiliary information may be provided at a substantially inaudible level.

An analog-to-digital (A/D) converter 62 converts the input signal to the digital domain for combination in multiplier 64 with the same pseudorandom sequence PN(n) used at the encoder. The pseudorandom sequence is provided by a PN sequence generator 66 which is identical to the PN sequence generator 48 found at the encoder. The multiplication performed by circuit 64 demodulates the spread spectrum signal, which is then despread in a conventional manner by integration and dumping circuit 68. The despread output z'(l) comprises the FEC encoded auxiliary information. This information is decoded by FEC decoder 70 to output the recovered auxiliary information x'(m).

The amount of noise that can be added to the primary data signal without exceeding an interference threshold can be increased by using a colored noise signal instead of the white noise signal provided by the encoder of FIG. 3.

Figure 5A:
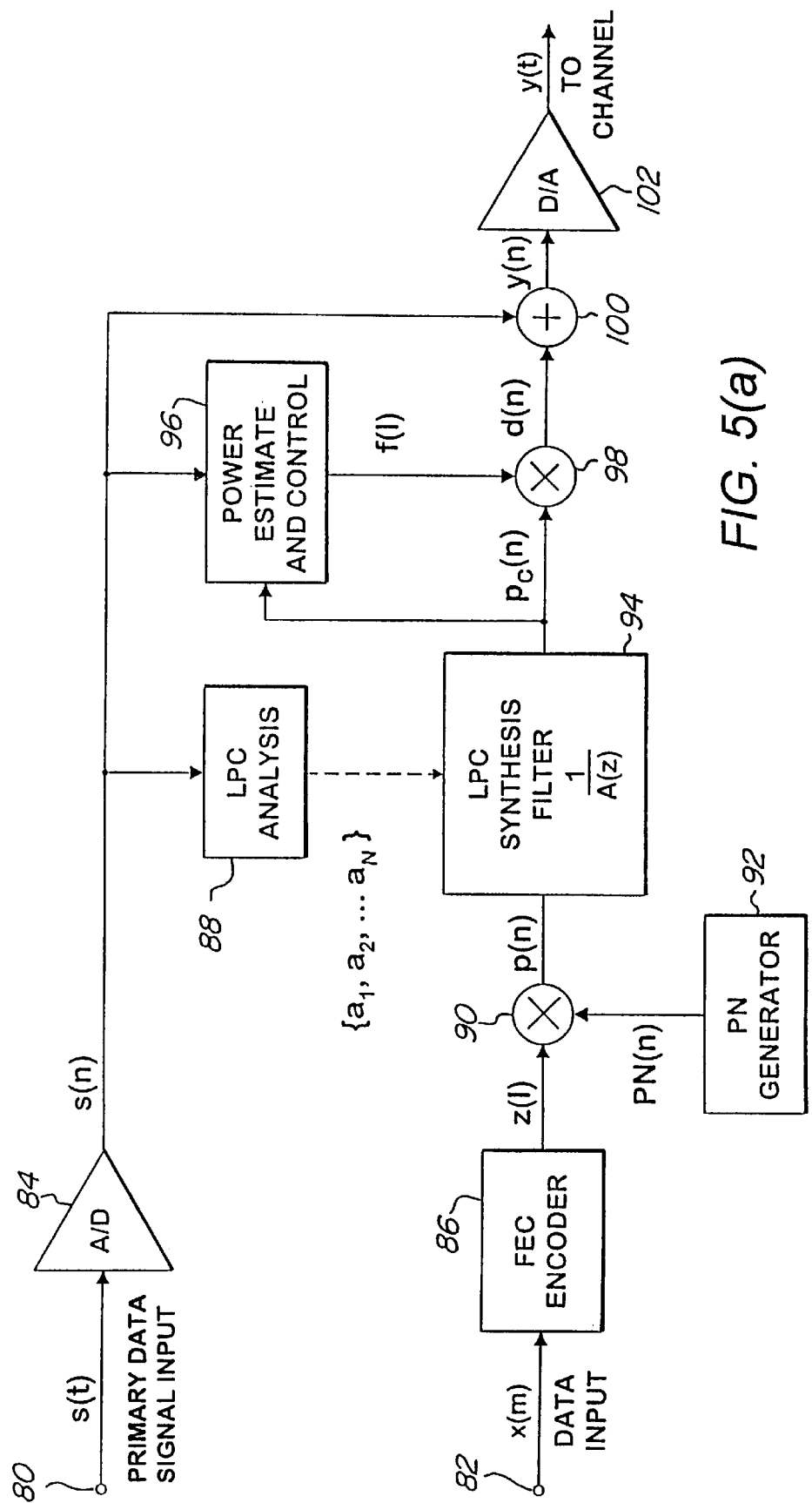
FIG. 5($a$) is a block diagram of an LPC embodiment of a hidden data transport encoder providing spectral shaping and power adjustment of the auxiliary information to be hidden in the primary data signal.
Figure 5B:
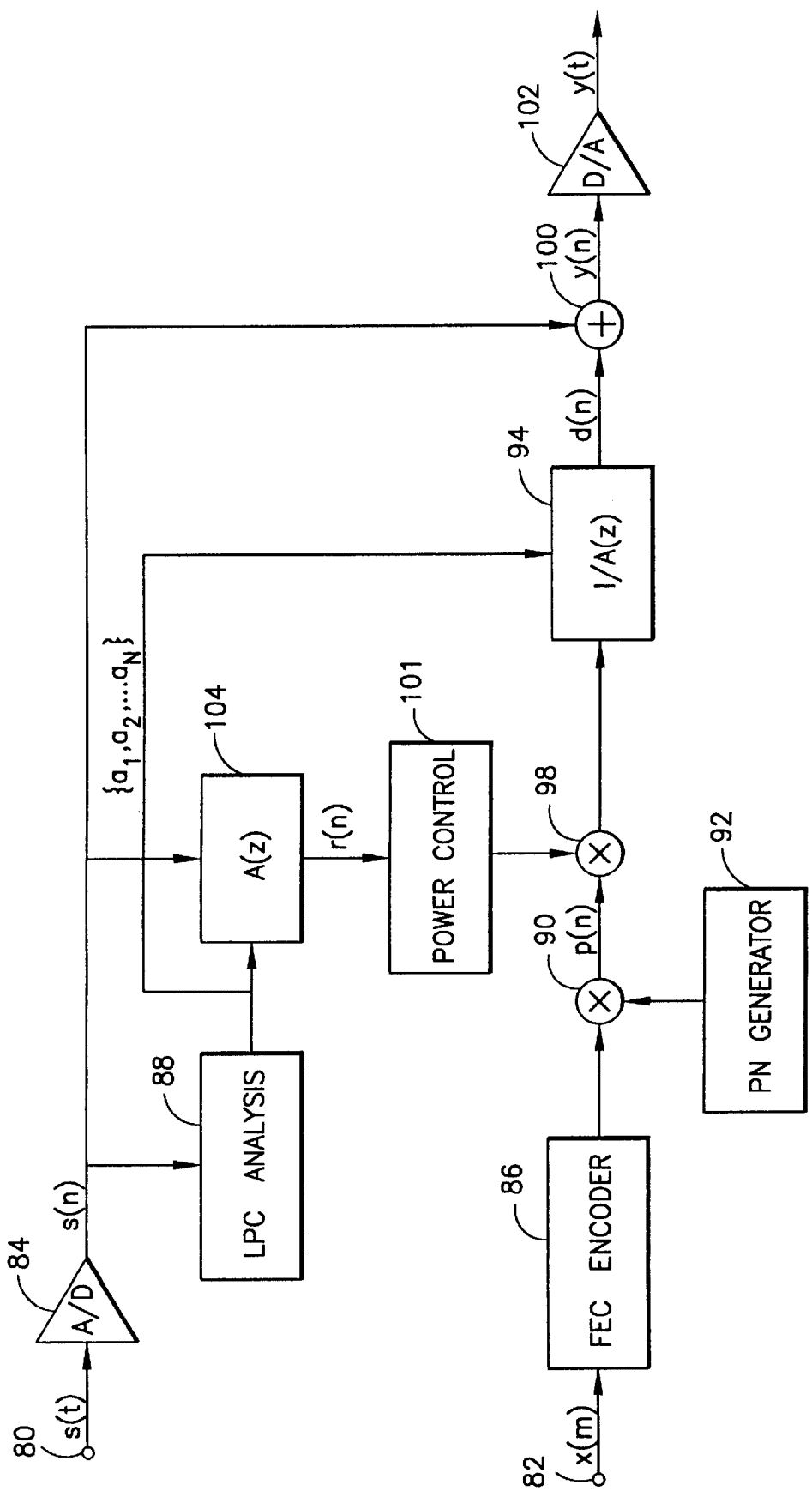
Figure 6:
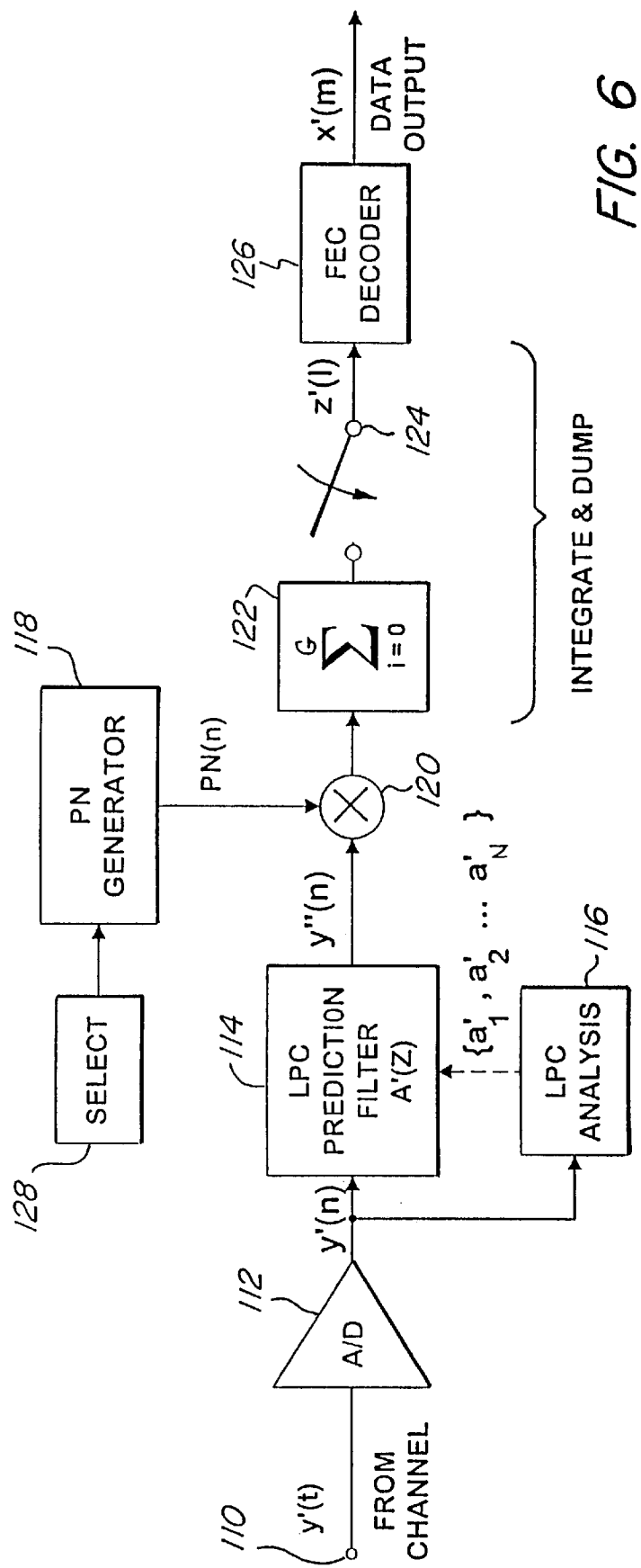
FIG. 6 is a block diagram of a decoder for recovering the hidden information output by the encoder of FIG. 5($a$) or FIG. 5($b$)

FIG. 5(a) shows an example of a colored noise HDT encoder in accordance with the present invention. The implementation illustrated analyzes the primary data signal information in the digital domain to determine its spectrum, colors the auxiliary data with the same spectrum, and combines the audio data with the colored auxiliary data digitally before the combined signal is converted back to the analog domain. It should be appreciated, however, that this implementation is merely an example of a preferred embodiment. The processing can be accomplished in either the digital or analog domain, and the signals can be transported as digital or analog signals depending on the particular requirements of the system using the invention. Thus, the provision of analog to digital and digital to analog converters in FIGS. 5(a), 5(b) and 6 is not meant to suggest that the processing in accordance with the present invention must take place as shown.

The primary data signal is input to the encoder of FIG. 5(a) via terminal 80. An A/D converter 84 converts the analog primary data signal to a digital form s(n). The auxiliary data x(m) to be transported with the primary data signal s(t) is input to an FEC encoder 86 via terminal 82. The FEC coding is used to ensure the integrity of the data, and generates coded symbol z(l). The ratio between the number of information bits and the number of coded bits is R=m/l. In this equation, the term m represents the sampling rate for x(m) and l represents the sampling rate for z(l). Elsewhere, when used with parentheses, m and l are sampling indexes for x(m) and z(l), respectively.

PN sequence generator 92 supplies the PN carrier PN(n) which, for example, can take on values of either +1 or −1. This provides a white long-term power spectrum. PN(n) is multiplied with z(l) in a multiplier 90 to generate the modulated PN sequence p(n).

The flat spectrum of the PN modulated signal p(n) undergoes spectral shaping in an LPC synthesis filter 94. The spectral shaping is applied by passing the PN modulated signal through filter 94 having the response 1/A(z), where $$A(z)=1-(a_1 z^{-1}+a_2 z^{-2}+ \ldots +a_N z^{-N})$$

and the $a_i$'s are the coefficients of an Nth order LPC filter.

The coefficients of the LPC filter used for the spectral shaping conform to coefficients derived from the primary data signal by an LPC analysis circuit 88. The LPC analysis can employ any of the known methods for analyzing a signal spectrum, such as Durbin's recursion discussed by L. Rabiner and R. Schafer, *Digital Processing of Speech Signals*, Prentice-Hall, 1978, Chapter 8.3.2, pp. 411–413.

The order N for the LPC analysis is made as large as necessary to accurately model the spectrum of the primary data signal. For example, an order of between about 5 and 50 should be adequate for the LPC analysis. As will be appreciated by those skilled in the art, the order N may depend on the bandwidth of the signal. Thus, for example, for typical telephone bandwidths, N may be selected in a range of from about 5 to about 20. The LPC filter coefficients are updated as often as necessary to track the frequency and amplitude variations of the primary data signal.

The output of LPC synthesis filter 94 is a modulated colored noise sequence $p_c(n)$. The noise power is adjusted via a power estimating and control circuit 96 and multiplier 98 to a desired level. For example, where it is desired to have the auxiliary information carried on the primary data signal with a specific noise power, the noise power is adjusted to fall below the specified level.

In other applications, it may be desired to set the noise power above an interference threshold level which does not interfere with the primary data signal. For example, in a copy protection scheme for digital audio tapes (DAT), it may be desired to add a noise signal to the digital audio in the primary data signal each time a copy is made. After a given number of copies, the cumulative noise will audibly degrade the quality of the recording. Alternatively, it may be desired to introduce a predetermined amount of interference to a primary data signal. In this case, the power estimation and control circuitry 96 will be adjusted to introduce the desired amount of noise (which may be above the interference threshold) to the primary data signal.

For each pseudorandom frame output from the filter 94, the average power in the primary data signal s(n) and the average power in $p_c(n)$ are measured by the power estimate and control circuit 96. Proper scaling f(l) is applied to $p_c(n)$ via multiplier 98 to maintain the output signal power d(n) at the desired power level, such as below an interference threshold. To render the auxiliary information below an interference threshold, the ratio of the auxiliary information to the primary data signal information is typically 1:1,000 in power (−30 dB) in an audio application. The power adjusted colored PN noise signal d(n) is added to the primary data signal s(n) via adder 100 to produce a combined output signal y(n). The output signal y(n) can be converted to an analog signal y(t) via a digital-to-analog converter 102, for transmission in place of the primary data signal s(t).

FIG. 5(b) shows another example of a colored noise HDT encoder in accordance with the present invention. The encoder is particularly adapted for use with a primary audio signal. Here, p(n) is power-adjusted before being spectrally shaped. The LPC analysis circuit 88 provides coefficients $\{a_1, \ldots, a_N\}$ to a filter 104 and the LPC synthesis filter 94. The LPC prediction filter 104 implements the transform function A(z) which is essentially the inverse of the spectrum of s(n). The filtered primary data signal input (designated r(n)), which has the transfer function S(z)A(z), where S(z) is the z-transform of s(n), is then provided to a power control function 101.

Figure 5C:
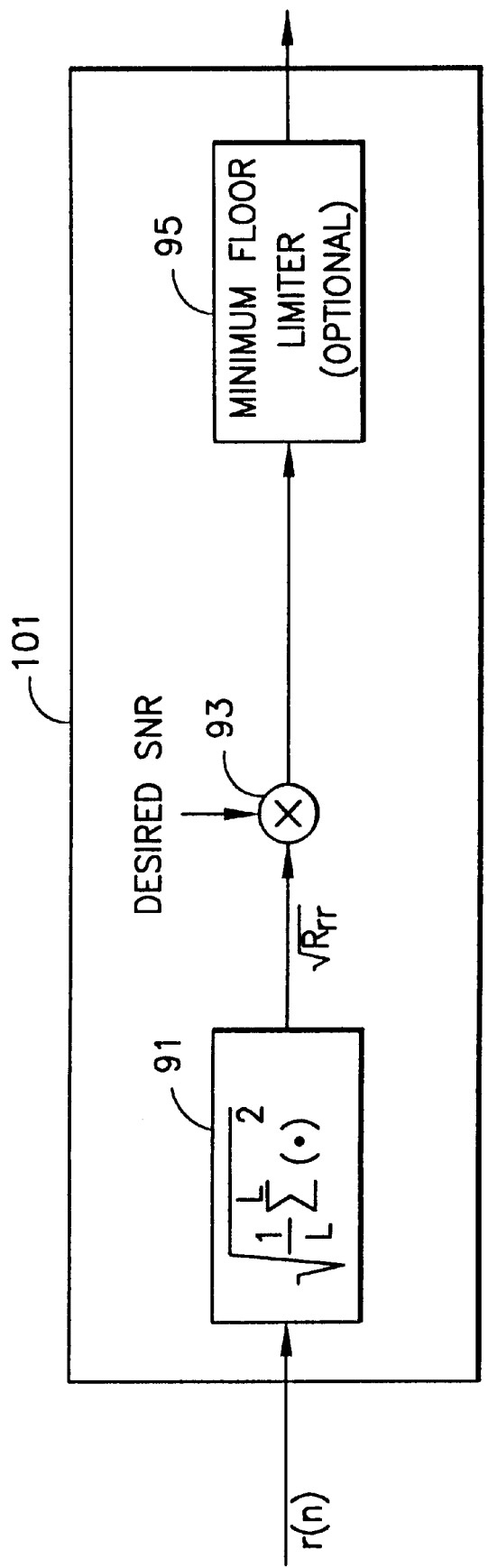

FIG. 5(*c*) is a block diagram of a power control function for use with the encoder of FIG. 5(*b*). The power control function 101 includes an average amplitude estimation function 91, a multiplier 93, and a limiter 95. The average amplitude estimation function 91 receives the filtered primary data signal input r(n) and estimates the average amplitude, in particular, by determining the root mean square of the amplitude of the filtered primary data signal input according to the following expression where the (·) is the amplitude of the filtered primary data signal input, and L is the number of data samples over which the average is taken:

$$\left[\frac{1}{L}\sum_{i=1}^{L}(\cdot)^2\right]^{\frac{1}{2}}$$

The estimated average amplitude is then multiplied by a signal-to-noise ratio (SNR) value at multiplier 93 to provide an amplitude adjustment signal. The SNR is a desired ratio of the auxiliary information to the EM information, and may be, for example, 1:1,000 in power (e.g., −30 dB). The amplitude adjustment signal is provided to an optional limiter function 95 which limits the adjustment signal to a minimum floor value.

By limiting the adjustment signal to a minimum, non-zero, floor level, it is possible to encode HDT data through silent portions of a primary audio data signal. For example, a musical passage may have silent intervals, or a compact disc or the like may have silent intervals between tracks. The amplitude adjustment signal may be used to provide the embedded data at an amplitude corresponding, for example, to one least significant bit out of sixteen bits which may be used to code the primary data signal. Thus, the amplitude of the embedded data will be equal to a quantization error. Moreover, the spectrum of the embedded data will be substantially flat and there will be no need for spectral shaping at the LPC synthesis filter 94.

Referring again to FIG. 5(*b*), the floor-limited amplitude adjustment signal is combined with the auxiliary data signal p(n) at a multiplier 97 to provide a power-adjusted auxiliary data signal, which is then provided to the LPC synthesis filter 94 for spectral shaping in accordance with the LPC coefficients $\{a_1, \ldots, a_N\}$.

Finally, the power adjusted and spectrally shaped (e.g., colored) PN noise signal d(n) is added to the primary data signal s(n) via adder 100 to produce the combined output signal y(n). The output signal y(n) may be further processed by the D/A converter 102 as discussed.

Advantageously, the embodiment of FIG. 5(*b*) is matched to the processing performed at a decoder of the present invention. Moreover, by performing the power adjustment prior to spectral shaping, the auxiliary data signal will be smoother since transitions between frames of data samples will be reduced. This is true since spectral shaping smooths out the power differences between adjacent frames of auxiliary data samples.

A hypothetical, but practical audio design example implementing the encoder of FIG. 5(*a*) or FIG. 5(*b*) can utilize an input data rate of 7.5 bits per second (m=7.5 Hz) for the auxiliary information input via terminal 82. The FEC encoder rate can be R=1/2 (l=15 Hz), and the processing gain (spread ratio) may be G=2,000 (33 dB). The pseudorandom sampling rate (chip frequency) is n=30 KHz. The LPC prediction order is N=10. It is assumed that the channel has at least 15 KHz of bandwidth with minor frequency distortions.

In the design example, the encoder uses binary phase shift keying (BPSK). In this example implementation, x(m), z(l), PN(n), and p(n) are binary signals, x(m)={0, 1}, z(l)={−1, +1}, PN(n)={−1, +1}, and p(n)={−1, +1}. The FEC encoder generates two samples of z(l) for every input sample of x(m). They may not be adjacent samples since an interleaver may be employed inside the FEC encoder. A PN frame is defined as a group of 2,000 PN chips (samples) of PN(n). For each sample of z(l), 2,000 chips of PN(n) in the PN frame are multiplied with z(l). In other words, the signs of 2,000 samples in the PN frame are changed if z(l)=−1. The resulting BPSK modulated PN signal p(n) has a white noise spectrum. The desired spectral shaping is obtained by passing p(n) through 1/A(z) to produce $p_c(n)$.

Although the primary data signal in the above design example is stronger than the noise signal (e.g., by 30 dB), the processing gain is very high. With R=1/2 and G=2,000, the effective processing gain is 4,000 (36 dB). The available bit energy over noise density (Eb/No) is 36−30=6 dB, which is very adequate for BPSK signaling.

It should be appreciated that the specific parameters noted in the above example are for purposes of illustration only. Other parameters may be used in a particular implementation, as will be appreciated by those skilled in the art.

In accordance with a further embodiment of the present invention, the SNR of a primary data signal carrier with embedded auxiliary data can be improved by accounting for the cross-correlation between the primary data signal and the pseudorandom noise carrier. Generally, in an embedded signaling system which employs a spread spectrum technique, the received SNR can be significantly affected by the cross-correlation between the pseudorandom spreading sequence and the host waveform (e.g., signal into which the data is being embedded). In accordance with the present invention, the deleterious effects of this cross-correlation can be dynamically compensated for so that variations in the SNR of the received signal are minimized, and the SNR is amplified and enhanced.

In an embedded signaling system (e.g., for audio, video, and other primary data signals), auxiliary information is added to the host waveform (e.g. primary data signal) such that the auxiliary information can be retrieved without substantially degrading the quality of the host waveform. In the case where the embedded information is carried by a spread spectrum signal, a pseudorandom sequence carrier is modulated by the auxiliary information. This spread spectrum signal may optionally be spectrally shaped to minimize the perceptual degradation before being combined with the host waveform to form the composite signal to be transmitted or recorded.

In a spread spectrum system, despreading is accomplished by correlating the received signal with a synchronized replica of the pseudorandom sequence carrier that was used at the encoder. Since the received signal at the decoder is a combination of the spread spectrum signal and the host waveform, the cross-correlation between the host waveform and the pseudorandom sequence carrier becomes a noise component in the despreading process.

In accordance with the present invention, compensation is performed at the encoder so that the decoder encounters less variation in received SNR. More importantly, the compensation effectively reduces or removes the noise component due to the host waveform and greatly enhances the received SNR at the decoder. As in any digital communication system, the receiver/decoder knows a priori the location in the signal space of each signal in the signal set. The cross-correlation between the host waveform and the pseudorandom sequence carrier can be viewed as a bias either towards or away from the intended location in signal space from the origin. Thus, the cross term compensation (CTC) in its simplest form fully restores each primary signal to the origin before additional embedded signal energy is added to place the embedded signal at the intended position in signal space. This is possible because the main source of interference, the primary signal (e.g., the host waveform), is completely known at the encoder. In other words, the channel noise is known at the transmitter. This situation is unique to embedded signalling.

Depending on the application, full compensation is not always practical or desirable. Firstly, the cross-correlation can be a very large value in some cases. While this may be rare, it may be undesirable to allow large compensation values. Secondly, cross-correlation resulting in a bias towards or overshoot away from the intended symbol may not need to be compensated. Moreover, less power for the spread spectrum signal is required in such cases to place the signal to the intended position in signal space. Thus, cross term compensation may include the following steps:

(1) Calculate the cross-correlation and compare the resulting bias with the intended location in signal space;

(2) If the resulting bias is towards the intended symbol in signal space, then the energy of the spread spectrum signal can be reduced accordingly; and (3) If the resulting bias is away from the intended symbol in signal space, then the energy of the spread spectrum signal can be increased accordingly.

A specific example implementation of the CTC scheme in accordance with the present invention for the transporting of auxiliary data in audio signals is illustrated below. However, it should be appreciated that the present invention can be adapted to a variety of embedded signaling systems (including video and others) and is not restricted to audio applications.

Techniques for embedding digital information in an audio signal exploit the limits of human auditory perception to create a hidden channel within a physical channel which is designed to carry an audio signal. The auxiliary information is transported as colored noise, which is spectrally shaped to simulate the spectral shape of the primary audio signal. The spectral shaping can be provided by any number of means, including subband or LPC filtering.

Figure 13:
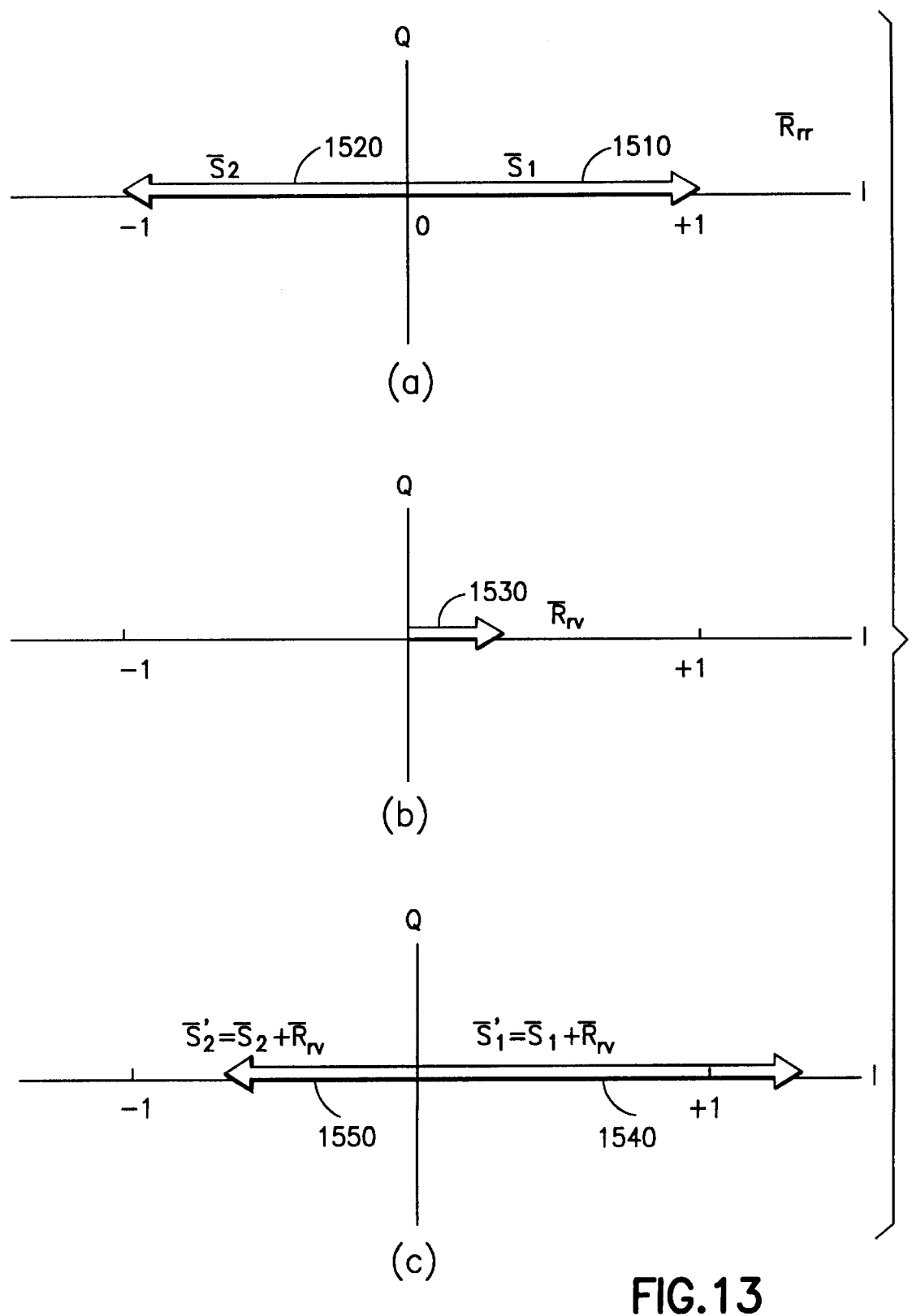
FIG. 13($a$) illustrates intended binary phase-shift keying (BPSK) vectors in a signal space.

FIG. 13(a) illustrates intended binary phase-shift keying (BPSK) vectors in a signal space. The horizontal axis indicates an in-phase (I) component, while the vertical axis indicates a quadrature-phase (Q) component. Note that BPSK modulation uses only the I component. The pseudorandom sequence is designated as v(n). The despread symbol value is therefore $R_{rv}$. Thus, the transmitted symbol may be either the vector $\bar{s}_1$ 1510 having a value of +1, or the vector $\bar{s}_2$ 1520 having a value of −1.

FIG. 13(b) illustrates a cross-correlation vector in a BPSK signal space. For each transmitted symbol, the cross term, $R_{rv}$, can be calculated. The vector $$\bar{R}_{rv}$$

1530 may have a value which is positive or negative. Accordingly, there will be a bias in the received symbol. If the bias from the origin is toward $\bar{s}_1$, and the intended transmit symbol happens to be $\bar{s}_1$, then it may be desirable to provide compensation for the bias by reducing the energy of the spread spectrum signal at the transmitter. Similarly, if the intended transmitted symbol is $\bar{s}_2$, then the energy of the spread spectrum signal may be increased.

FIG. 13(c) illustrates actual BPSK vectors with an additive or subtractive cross-correlation vector in a BPSK signal space. Without cross-term compensation in accordance with the present invention, the resultant signal vectors $\bar{s}_1'$ 1540 and $\bar{s}_2'$ 1550 are received by the decoder when $\bar{s}_1$ or $\bar{s}_2$, respectively, is transmitted. In particular, the received vector is equal to the sum of the transmitted vector and the cross-term compensation vector, $$\bar{R}_{rv}.$$

Thus, it would be desirable to account for cross-term compensation at the transmitter to improve decoding accuracy at the receiver.

Figure 14A:
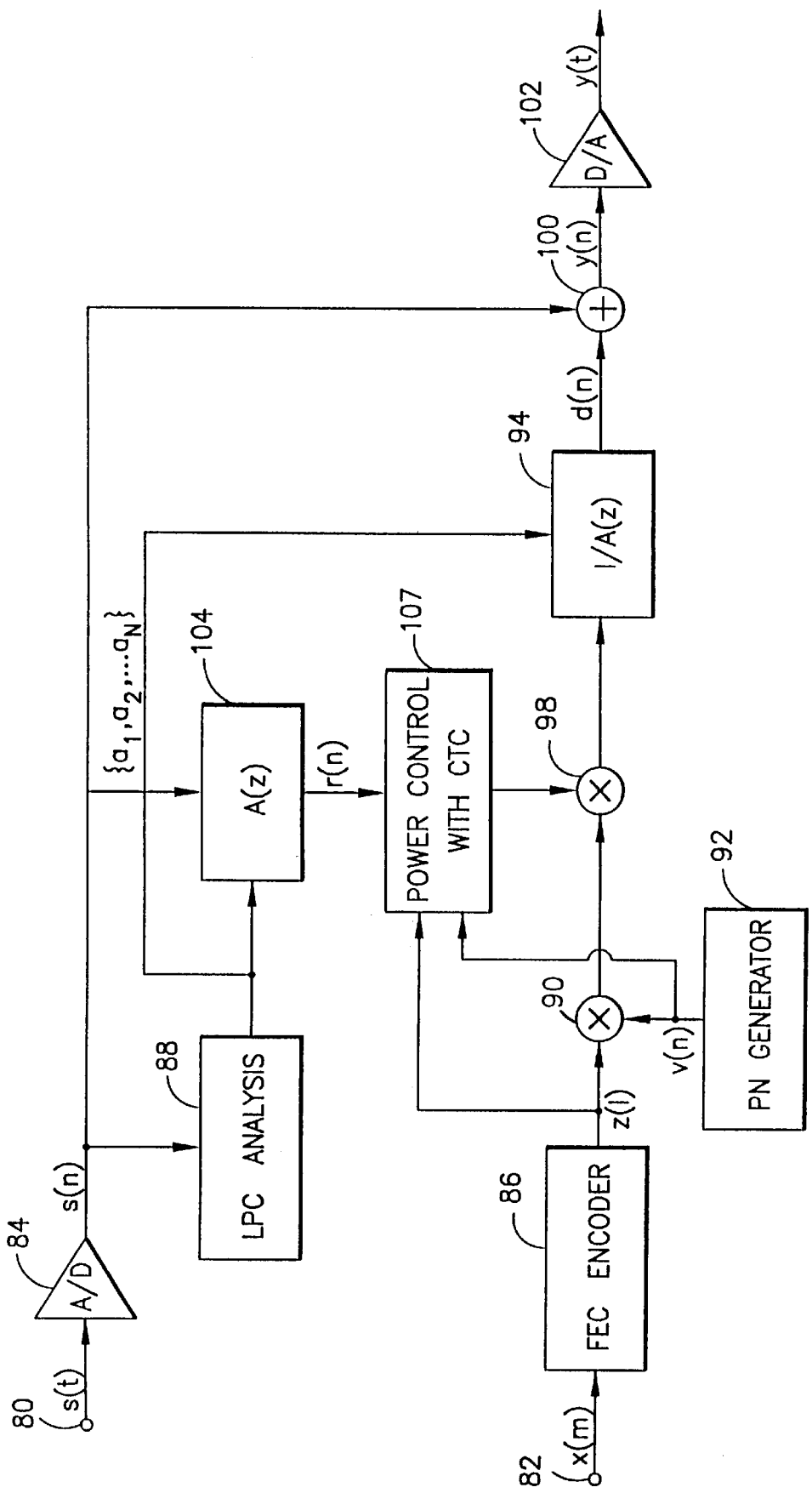
FIG. 14($a$) is a block diagram of an embodiment of an LPC hidden data transport encoder providing spectral shaping and power adjustment with cross-term compensation of the auxiliary information to be hidden in the primary data signal.

FIG. 14(a) is a block diagram of an embodiment of an LPC hidden data transport encoder providing spectral shaping and power adjustment with cross-term compensation of the auxiliary information to be hidden in the primary data signal. The encoder is similar to the embodiment of FIG. 5(b) except the function 107 provides power control with cross term compensation (CTC). The function 107 receives both the filtered primary data signal input r(n), the PN carrier, designated v(n) here, from the PN generator 92, and, optionally, the coded symbol z(l).

Figure 14B:
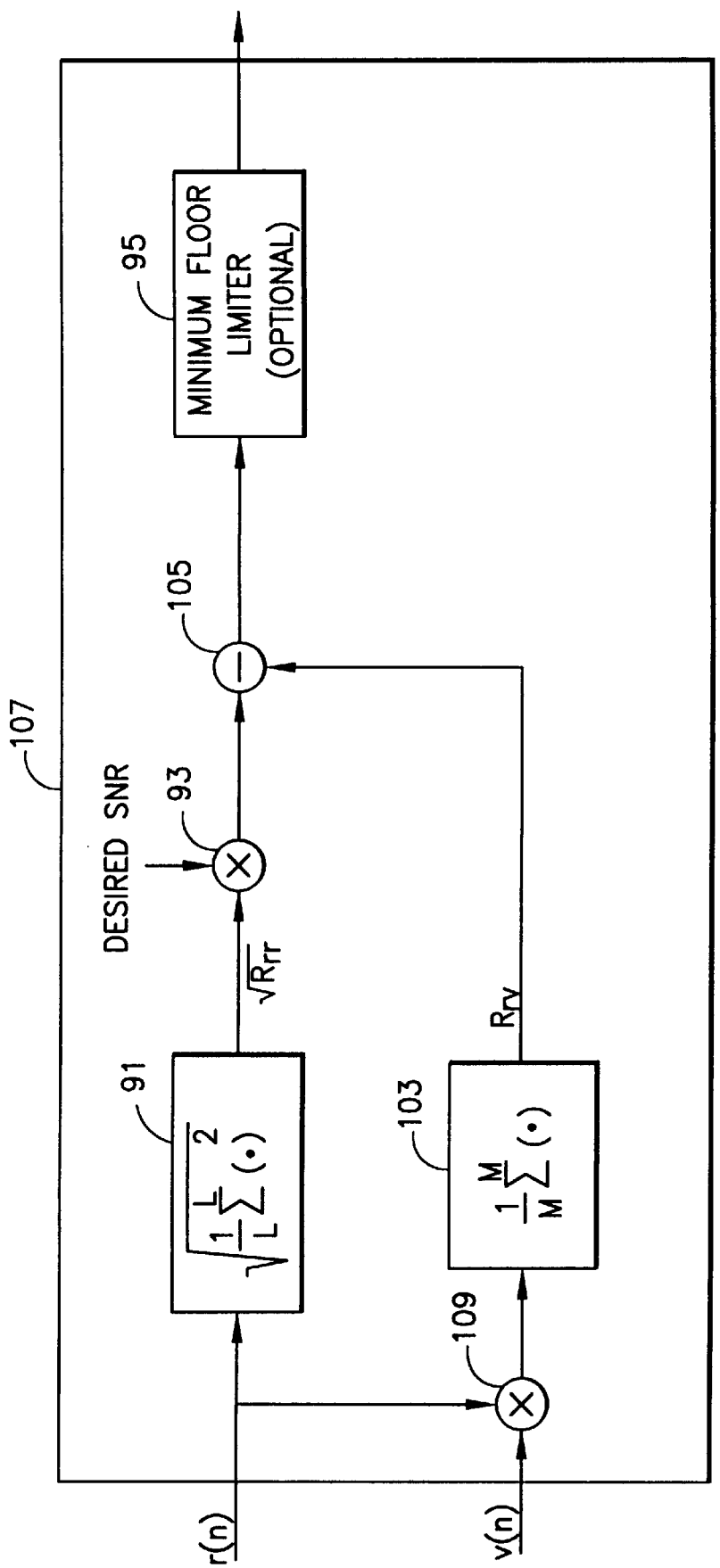

FIG. 14(b) is a block diagram of a power control function with full cross term compensation for use with the encoder of FIG. 14(a). In this specific implementation, the gain control for the spread spectrum signal is adjusted to render the spread spectrum signal below an audible threshold. This is accomplished by making the spread spectrum signal power proportional to the estimated average amplitude of the linear predictive coding (LPC) prediction filter 104 output. This example further assumes that BPSK modulation is used. The cross-correlation between the PN and the "whitened" primary audio signal is calculated in the power control circuit 107.

In particular, the function 107 includes the average amplitude estimation function 91, a multiplier 93, and a limiter 95 discussed above in connection with FIG. 5(c). Additionally, a multiplier 109 multiplies r(n) with v(n) and provides the result to a CTC function 103, where the cross-correlation $R_{rv}$ is calculated. Here, the spread spectrum signal power is additionally adjusted by CTC, which is calculated as follows. The residual from the LPC prediction filter, r(n), is correlated with the PN, v(n), and accumulated over the length of a symbol (or partial symbol), M, as indicated by the following equation:

$$R_{rv} = R_{rv}[k]\mid_{k=0} = \frac{1}{M}\sum_{n=0}^{M-1} r(n)\cdot v(n+k)$$

$R_{rv}$ is subtracted from the output of the multiplier 93 at a subtracter 105. The resulting signal is then floor-limited at function 95 as discussed previously. The power adjustment signal output from the floor limiter 95 is then provided to multiplier 98 of FIG. 14(a) to adjust the power of the PN carrier signal, thereby maintaining the output signal power d(n) at the desired power level.

Figure 14C:
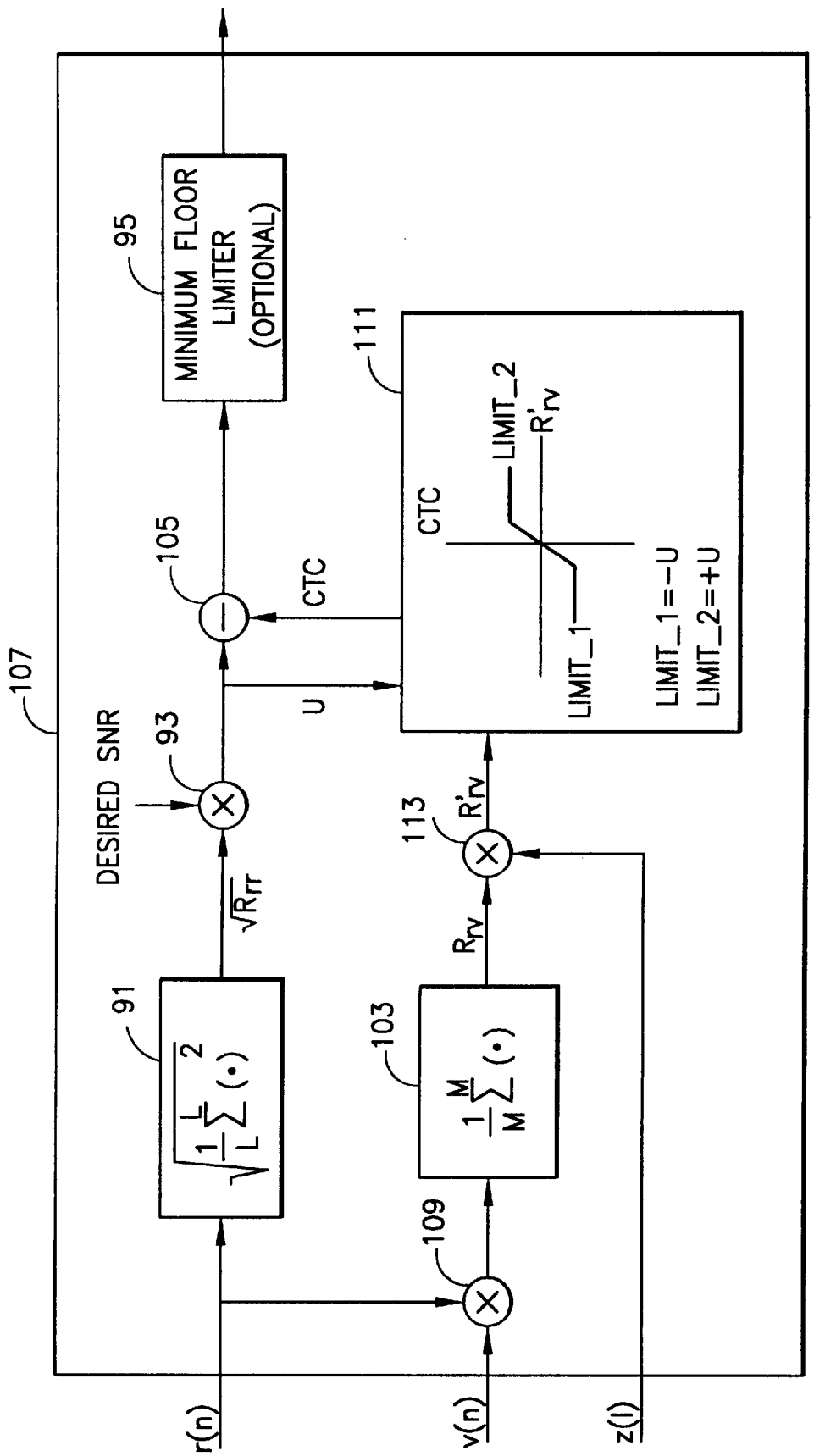

FIG. 14(c) is a block diagram of a power control function with limited cross term compensation for use with the encoder of FIG. 14(a). For practical applications, the amount of compensation may be limited in order to avoid excessive distortion of the host waveform (hence the limit values of limit_1 and limit_2).

Here, a power control with CTC function 107 is provided. Specifically, $R_{rv}$ and the coded symbol z(l) from the FEC encoder 86 of FIG. 14(a) are multiplied at a multiplier 113 to produce the term $R'_{rv}$. When BPSK modulation is used, the multiplier 113 essentially assigns a positive or negative sign to $R_{rv}$. $R'_{rv}$ and, optionally, the power adjustment term U which is output from the multiplier 93 are provided to a CTC calculation function 111. The CTC calculation function 111 uses $R'_{rv}$ to calculate a CTC adjustment term, CTC. For example, the function 111 may implement as graph as shown, where the horizontal axis defines the value of $R'_{rv}$, and the vertical axis defines the corresponding value of CTC which is output to the subtracter 105.

In particular, when the coded symbol z(l)=+1, $R'_{rv}$>0. Furthermore, if $R'_{rv}$ is a large positive number, then CTC=limit_2. Similarly, when the coded symbol z(l)=−1, $R'_{rv}$<0, and if $R'_{rv}$ is a large negative number, then CTC=limit_1. In a transition region, as $R'_{rv}$ increases, CTC ramps up from limit_1 to limit_2. The terms limit_1 and limit_2 may be determined experimentally to obtain the best results. Moreover, limit_1 and limit_2 may be set according to the value U. In a particular embodiment, limit_1=−U and limit_2=+U may be used.

Thus, it should be understood that the implementation of the CTC calculation function 111 of FIG. 14(c) is an example only, and various alternative schemes may be provided. For example, the transition region between limit_1 and limit_2 is not required to be linear. Moreover, more than one curve or graph may be used to relate $R'_{rv}$ with CTC. A particular curve may be selected based on the magnitude of U, channel characteristics (e.g., linear vs. non-linear), or other criteria.

In a further application of the present invention, acquisition and synchronization of a received signal can be enhanced by using the cross-term compensation technique disclosed herein. In particular, the probability of false acquisition can be lessened by reducing secondary correlation peaks. At a decoder, different PN sequences are generated by a PN generator and correlated with the received signal. The energy of a primary peak in the correlated signal is then determined to find the best match. The process may be repeated successively by offsetting the generated sequence by one chip. However, the correlated signal may also have secondary energy peaks which are caused by noise and other factors, where the amplitude of the secondary peaks is similar to the amplitude of the primary peak.

In accordance with the present invention, the power of the PN signal can be increased by predicting what the secondary peaks will be and compensating for their presence at the transmitter/encoder. The cross-term compensation can be computed at every chip position to estimate the secondary peaks that the receiver/decoder will see, and a corresponding compensation can be applied. Accordingly, the magnitude of the secondary peaks received by the decoder is lessened, and acquisition is improved.

Additionally, tracking can be enhanced using the same technique by equalizing the early/late tracking values. Reducing the cross-correlation in the early and late chips can be very effective.

Note that the cross-term compensation techniques discussed above can be used with any embedded signaling system and are not limited to spread spectrum systems.

FIG. 6 illustrates a decoder for the signals output from the encoder of FIG. 5(a) or FIG. 5(b). The decoder receives y'(t) via terminal 110. In order to undo the spectral shaping applied by the LPC synthesis filter 94 at the encoder and recover p(n), the decoder must have the LPC filter coefficients. However, these coefficients are not necessarily transmitted by the encoder, even though the LPC order N is fixed and known to the decoder. Instead, the decoder may perform its own LPC analysis on the received signal using LPC analyzer 116 to estimate the LPC filter. The coefficients derived from the estimate are input to an LPC prediction filter 114 that is the inverse of the LPC synthesis filter 94 at the encoder. Since s'(t) is the dominant component in the received signal, which is a good replica of s(t), and due to the averaging process embedded in the LPC analysis (providing a wide analysis window), the estimated LPC coefficients $a'_1, a'_2 \ldots, a'_N$ can be very close to the LPC coefficients $a_1, a_2 \ldots, a_N$ used at the encoder.

Once the coefficients for the LPC prediction filter A'(z)= $[1-(a'_1 z^{-1}+a'_2 z^{-2}+ \ldots +a'_N z^{-N})]$ are found, the sampled received signal, y'(n), is filtered to produce y"(n)=s"(n)+p'(n)+g'(n). p'(n) is a close replica of p(n) since the combined influence of the LPC synthesis filter 1/A(z) and the channel response H(z) is cancelled by the LPC prediction filter A'(z). Both s"(n) and g'(n) are the prediction residuals when s'(n) and g(n) are filtered by A'(z), respectively. The effect of g'(n) can be largely ignored due to a high processing gain. A'(z) removes much of the redundancy in s'(n) so that s"(n) will have a flat, white spectrum. The power in s"(n) is also lowered by a typically large prediction gain of the LPC filter A'(z). Consequently, s"(n)+g'(n) becomes a white noise interference to p'(n), which itself has a white noise spectrum.

The remaining steps for recovering the auxiliary data from p'(n) are similar to those used by the direct sequence spread spectrum demodulator of FIG. 4. The same PN sequence synchronized to the PN sequence used at the encoder is multiplied with y"(n) using PN generator 118 and multiplier 120. A select circuit 128 selects a desired PN chip offset and/or the PN sequence itself. The integration and dump circuit comprising summer 122 and switch 124 despreads and recovers z'(l) and integrates out much of the power in s"(n)+g'(n). In the example embodiment illustrated, the correlation property of the PN sequence allows a constructive summation of all G=2,000 chips in p(n) to produce z'(l). In this example, switch 124 is switched at a rate of 15 Hz, and z'(l) has an SNR of about 3 dB (2:1), which is high enough for a simple FEC decoder with R=1/2 to reliably decode x'(m) at 7.5 bps. The signal to noise ratio (signal being z'(l)) is improved by the processing gain G=n/l. Finally, the FEC decoder 126 performs the error correction necessary to produce a reliable estimate of the auxiliary data x'(m).

Figure 7:
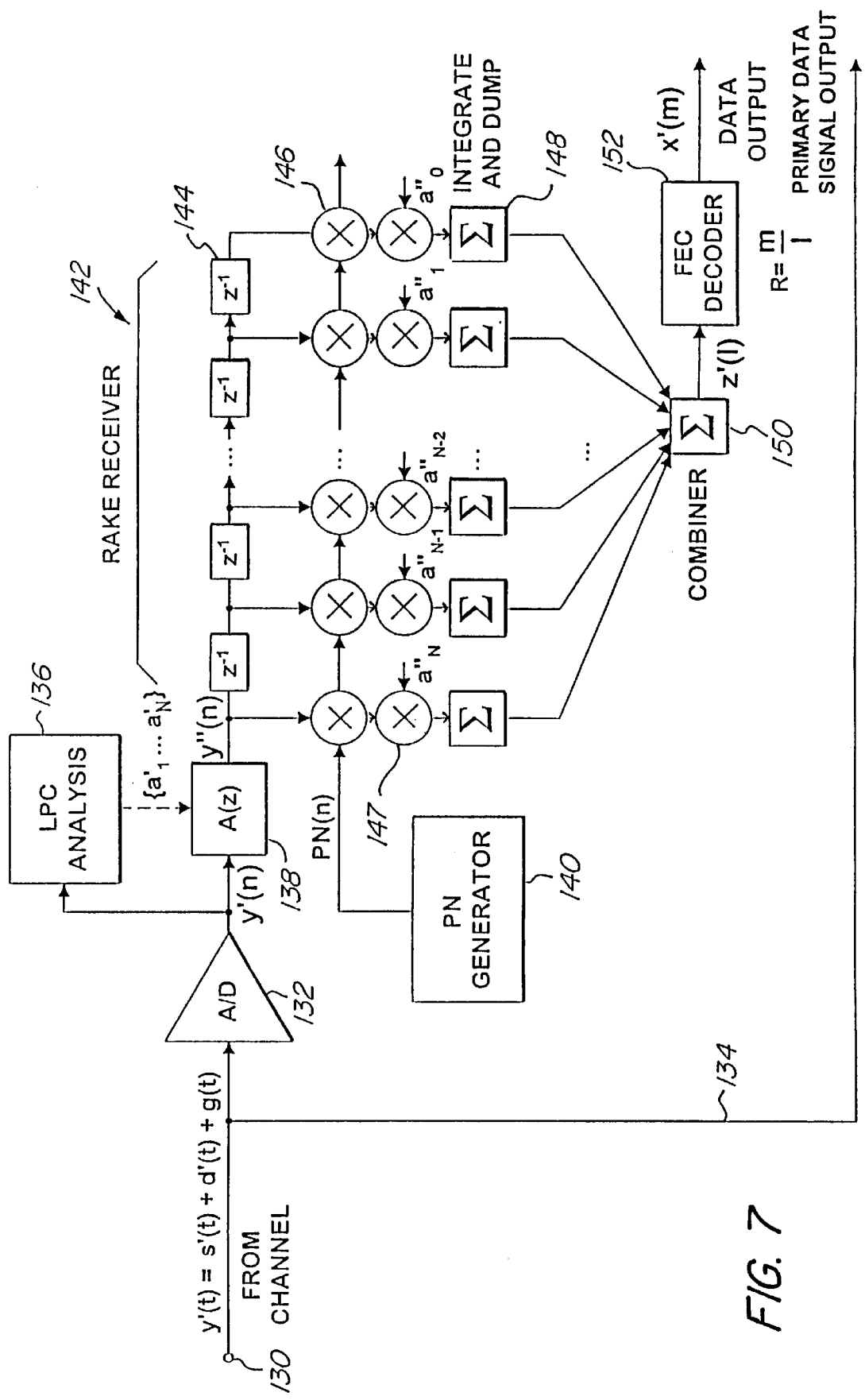
FIG. 7 is a block diagram of a hidden data transport decoder using a rake receiver.

FIG. 7 illustrates an embodiment of a decoder using a rake receiver. This decoder is useful in decoding auxiliary information from a primary data signal produced by a white noise encoder of the type illustrated in FIG. 3. Although an uncolored white noise signal is more audible for a given power level than a colored noise signal with suitable spectral shaping, the performance of white noise signaling (e.g., as provided by the encoder of FIG. 3) can be significantly improved by a combination of an LPC filter and a rake receiver. This is achieved by using a much lower noise power than in the colored noise case, and relying on the LPC prediction gain at the receiver to reduce the interference power of the primary data signal. However, the LPC prediction filter A(z) will shape the noise signal while whitening the spectrum of the primary EM. This intersymbol interference introduced by A(z) is overcome by a rake receiver generally designated 142 in FIG. 7, which treats each coefficient of A(z) as a multipath component.

FIG. 7 illustrates such a decoder that uses an LPC prediction filter comprising LPC analyzer 136 and LPC filter 138 together with rake receiver 142. The number of taps or "fingers" of the rake receiver must approximately match the order of the LPC filter, N. Each finger includes a multiplier 146 that receives the PN(n) sequence from PN generator 140 and a tap weight formed from a multiplier 147 that multiplies the output from the respective multiplier 146 by a respective tap weight.

The illustrated decoder utilizes a simple combining strategy that literally sums all the energy from each finger in a combiner 150. This is accomplished by setting the tap weights to 1, e.g., $a''_0=1$, $a''_1=1$, $a''_2=1$, ..., $a''_N=1$. A more optimal combining strategy can be implemented, which dynamically changes the weights on each finger depending on the LPC coefficients. For example, a constant term $a''_0$ can be set to 1, $a''_1$ can be set to equal the LPC coefficient $a'_1$, $a''_2$ can be set to equal LPC coefficient $a'_2$, and so on, where the LPC coefficients $a'_1$, $a'_2$, ..., $a'_N$ are the coefficients computed locally by LPC analyzer 136.

Prior to combiner 150, the weighted outputs for each finger are integrated and dumped using circuits 148 that correspond to components 122 and 124 of FIG. 6. The output of combiner 150 is decoded in FEC decoder 152, assuming that the original auxiliary information data was FEC encoded. The primary data signal received at terminal 130, which includes the auxiliary information as white noise, is output via line 134 for conventional processing.

Figure 8:
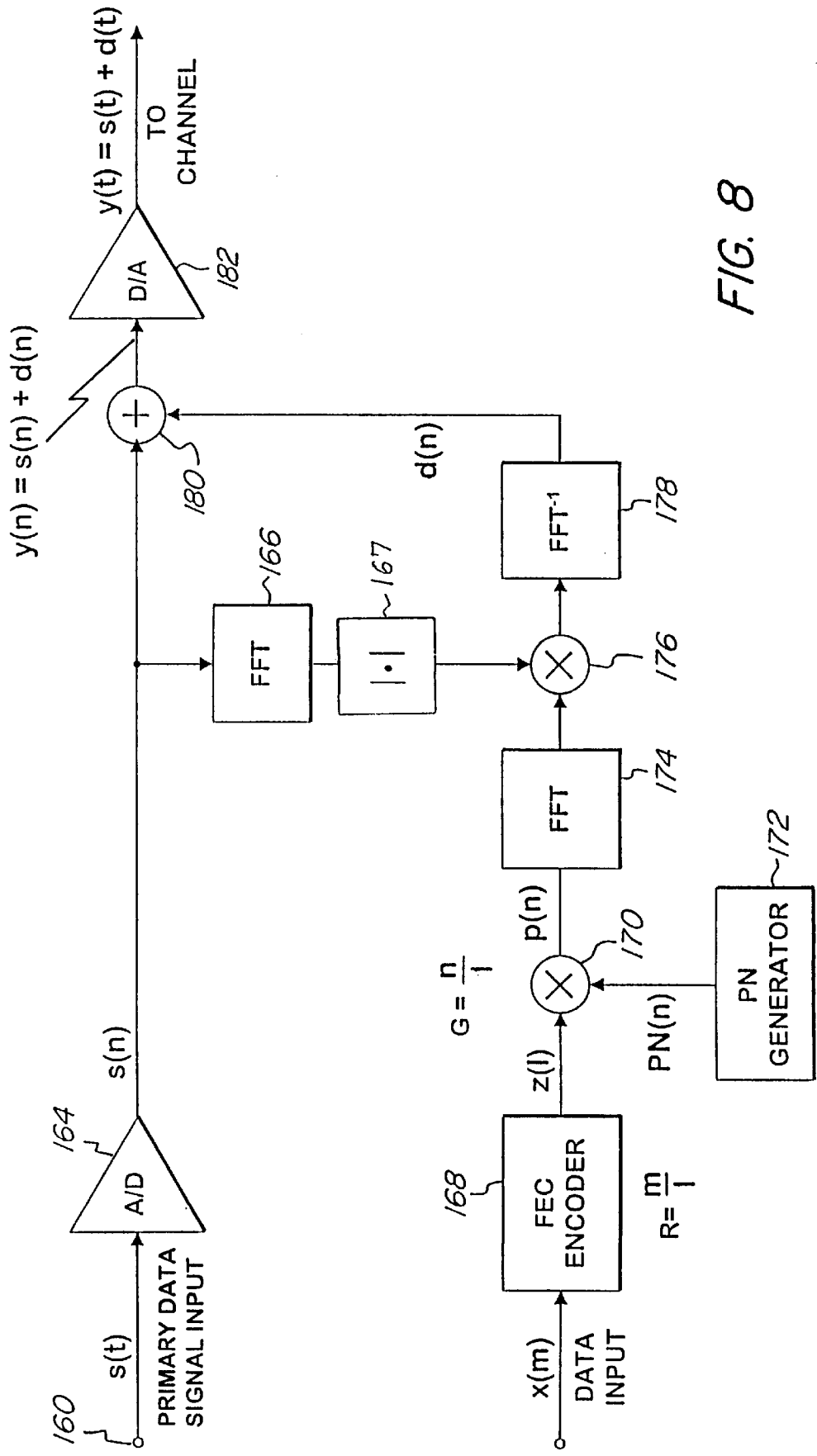
FIG. 8 is a block diagram of a hidden data transport encoder using subband coding, and particularly fast Fourier transform techniques, to spectrally shape the information to be hidden on the primary data signal.

In an alternate colored noise embodiment, the spectral shaping is provided by subband coding techniques instead of linear predictive coding. As used herein, the term subband coding is meant to include transform coding. An example of an encoder using subband coding for spectral shaping is illustrated in FIG. 8. A corresponding decoder is illustrated in FIG. 9.

FIG. 8 illustrates an encoder wherein the LPC filter is replaced by a fast Fourier transform (FFT) operation. Instead of the LPC analysis, an FFT of the primary data signal is computed by FFT 166, and the absolute value is taken at function 167. This provides the spectral shape information of the primary data signal, which can be used to shape the PN noise signal to match that of the primary data signal. The LPC synthesis filter of FIG. 5(a) or FIG. 5(b) is replaced with an FFT 174, followed by a frequency weighting performed by multiplier 176, followed by an inverse FFT operation performed by inverse FFT processor 178. As in the embodiments of FIG. 5(a) and FIG. 5(b), the primary data signal is received by a D/A converter 164 via an input terminal 160, the output of which is summed in a summer 180 with the colored noise output from inverse FFT processor 178. The auxiliary information data is input to an FEC encoder 168 via terminal 162. The output of the FEC encoder is combined with a pseudorandom sequence from PN generator 172 in multiplier 170. The primary data signal combined with the colored noise is converted by D/A converter 182 to an analog signal for transmission on a communication channel. As noted in connection with the embodiments described above, the FEC encoder is optional, and the A/D and D/A converters may or may not be necessary, depending on the particular form in which the primary data signal is received and the form in which it is intended to be output.

Figure 9:
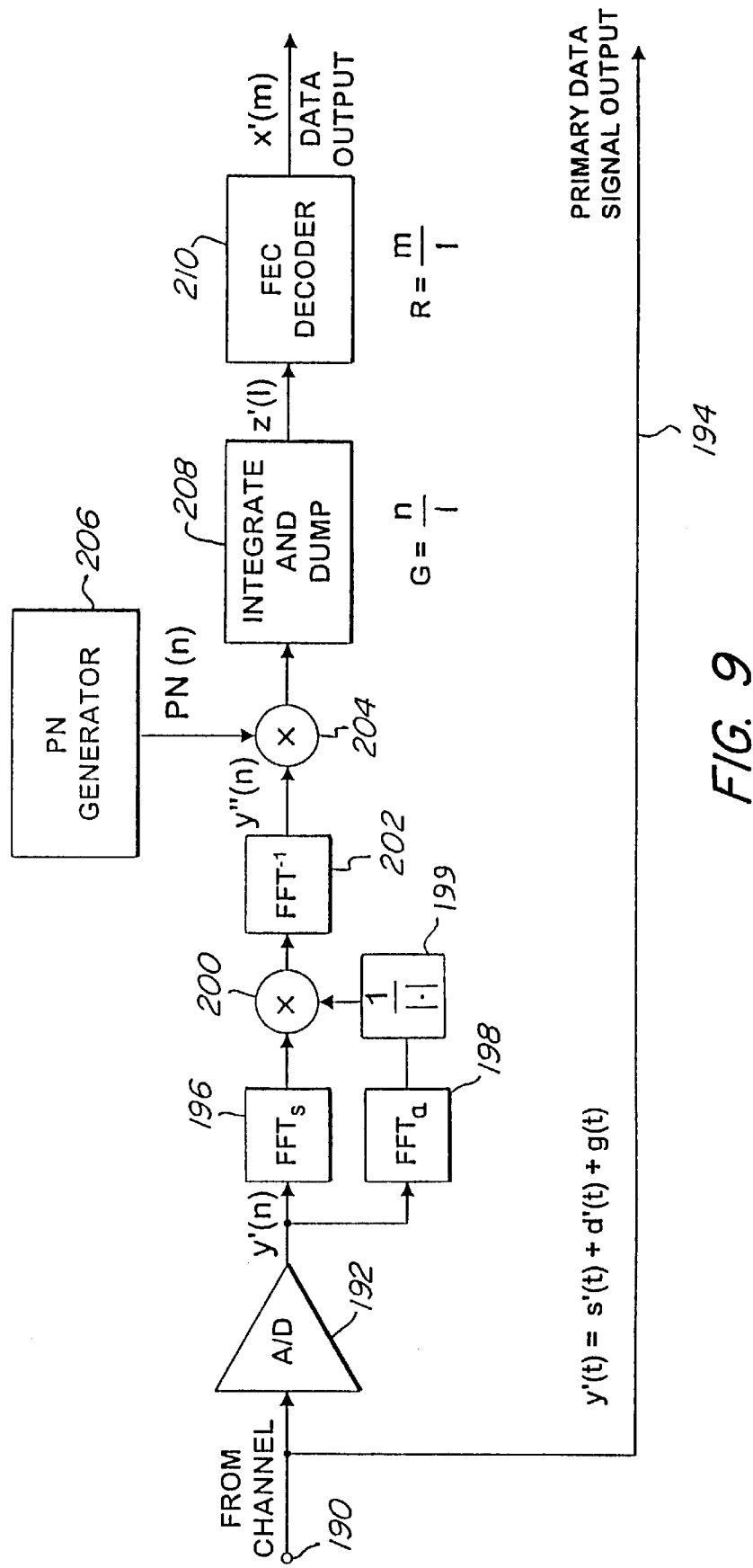
FIG. 9 is a decoder embodiment for use in recovering the information hidden using the encoder of FIG. 8.

FIG. 9 illustrates a decoder which receives the output from the encoder of FIG. 8 via terminal 190. If necessary, A/D converter 192 converts the analog input to a digital signal for processing by a shaping FFT 196 ("FFTs") and an analysis FFT 198 ("FFTa") and inverse absolute value function 199. The outputs of these FFT's are combined by multiplier 200 for input to inverse FFT processor 202. The resultant whitened spread spectrum signal is demodulated using PN generator 206 and multiplier 204, as well as the integrate and dump circuit 208. FEC decoder 210 provides forward error correction decoding if necessary. The received signal which includes the primary data signal and the auxiliary information carried thereon in the form of noise is output via line 194 to conventional processing circuitry.

Note that the length of the analysis FFT 198 must be long enough to reliably estimate the spectrum of the primary data signal. However, the length of the noise shaping FFT 196 does not have to be the same as the analysis FFT. If a shorter length is called for, a finite impulse response (FIR) filter can replace the noise shaping operation without much computational penalty. The FIR filter would have to be dynamically designed from the result of the analysis FFT using any well known filter design technique, such as those disclosed in Oppenheim & Schafer, *Digital Signal Processing*, Chapter 5.6.

The techniques of the present invention can be used to communicate a plurality of different auxiliary information signals on the same primary data signal. One embodiment of an encoder for accomplishing this is illustrated in FIG. 10.

Figure 10:
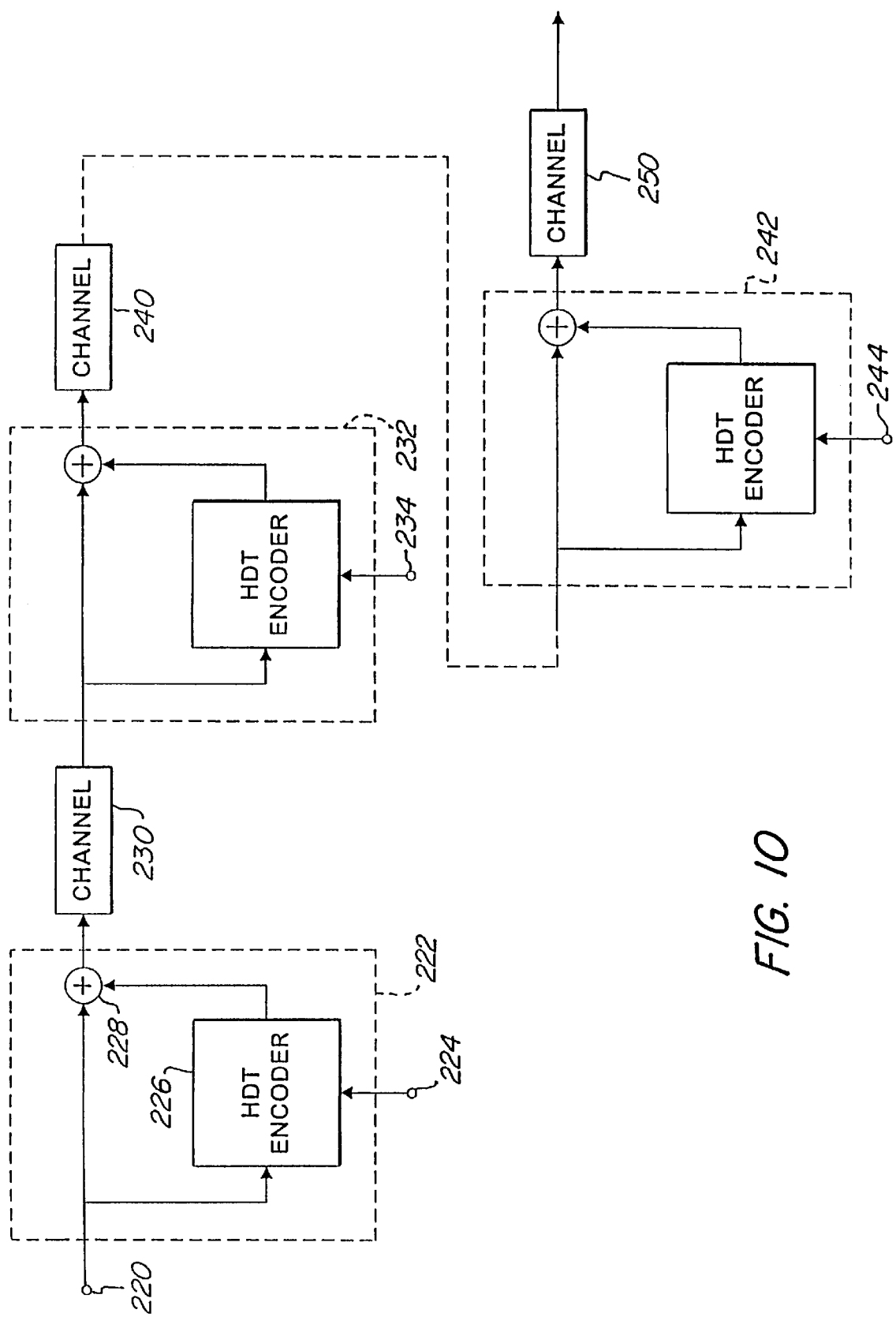
FIG. 10 is a series embodiment for hiding a plurality of auxiliary information signals on a primary data signal.

FIG. 10 shows a "cascaded" embodiment wherein the primary data signal is input via terminal 220. A first encoder 222 includes an HDT encoder 226 that adds a first auxiliary information signal input via terminal 224 to the primary data signal via combiner 228. The output of encoder 222 is communicated over a channel 230 to another encoder 232. This encoder can be identical to encoder 222, and adds a second auxiliary information signal input via terminal 234 to the primary data signal which already contains the first auxiliary information signal. The output of encoder 232 is communicated via channel 240 to a subsequent encoder 242, which can be identical to encoders 222 and 232. Encoder 242 receives a third auxiliary information signal via terminal 244, and adds it to the primary data signal already including the first and second auxiliary information signals. The output of encoder 242 is communicated via channel 250.

Any number of auxiliary information signals can be combined using cascaded encoders as illustrated in FIG. 10. Each HDT encoder 226 can include a power control (such as component 96 illustrated in FIG. 5(a)) to individually control the power level at which each auxiliary information signal is added to the primary data signal.

Figure 11:
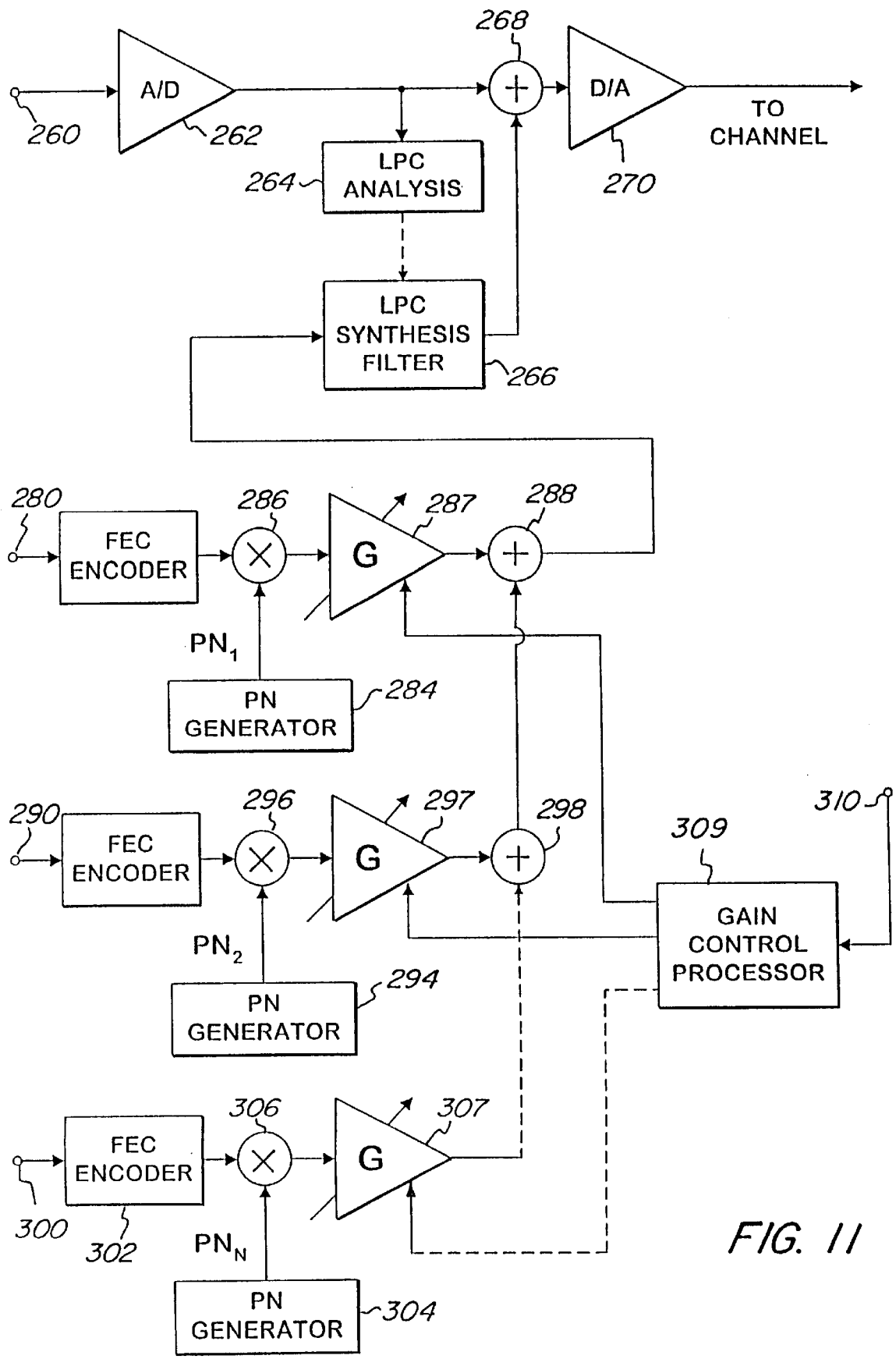
FIG. 11 is a parallel embodiment for hiding a plurality of auxiliary information signals on a primary data signal.

FIG. 11 illustrates an example wherein separate auxiliary information signals are processed to provide corresponding spread spectrum signals, which are combined for spectral shaping as a group. In particular, the primary data signal is input via terminal 260 to an A/D converter 262 (which may not be used depending on the implementation) and its spectrum is analyzed by LPC analyzer 264. A first auxiliary information signal (or group of signals) is input to optional FEC encoder 282 via terminal 280. The signal input via terminal 280 can be an individual stream or a combination of individual streams, and may comprise data and/or synchronization information. It is noted that while each stream will be modulated on a spread spectrum carrier, an unmodulated carrier can also be transported, e.g., as a pilot signal. Such a pilot signal is useful for various synchronization purposes at a decoder, including acquisition and tracking, synchronizing the demodulator, PN sequence synchronization and/or FEC synchronization.

The signal input at terminal 280 is converted to a spread spectrum format using PN generator 284 and multiplier 286. A second auxiliary information signal, which may also comprise a combination of different data streams, is input to optional FEC encoder 292 via terminal 290. This signal is converted to a spread spectrum format by PN generator 294 and multiplier 296. An "Nth" auxiliary information signal (which may comprise a combination of different data streams) is input to optional FEC encoder 302 via terminal 300, and converted to a spread spectrum signal by PN generator 304 and multiplier 306. The second and Nth spread spectrum signals are combined in a combiner 298, and these are combined with the first spread spectrum signal in combiner 288.

The PN generators 284, 294 and 304 can all operate at the same or different rates. For example, if the data input to terminals 280, 290 and 300 is provided at different rates, the PN generators may be provided at different rates as a means of distinguishing the auxiliary information signals at a decoder. If all of the PN generators operate at the same rate, then their PN sequences will preferably all be orthogonal with respect to each other to facilitate distinguishing the different input data streams at the decoder, in accordance with well known spread spectrum demodulation techniques.

A variable gain stage can be provided after any or all of the multipliers 286, 296 and 306 for adjusting the gain of the corresponding spread spectrum signal in each path. Such gain stages 287, 297 and 307 are illustrated in FIG. 11. The gain of any path can be adjusted based on the gain(s) of any of the other paths, in order to provide the different auxiliary information signals at desired levels in the primary data signal. Allocation of the total combined signal gain among the auxiliary information signals in each path is provided by a gain analyzer and control processor 309 that sets and maintains a relative signal strength among the multiple streams and can independently adjust the appropriate gain stage(s) 287, 297 and/or 307 for adjusting the gain in each path. A control input 310 is provided to enable manual or dynamic adjustment of the relative signal strength among the data streams. For example, a manual adjustment can be effected upon the installation of the apparatus. Alternatively, or in addition to a manual adjustment, dynamic control can be provided during the operation of the system.

The combined, gain adjusted spread spectrum signals output from combiner 288 are spectrally shaped in LPC synthesis filter 266 to simulate the spectral shape of the primary data signal. The resultant colored noise output is combined with the primary data signal in combiner 268 for D/A conversion (if necessary) in converter 270. It should be appreciated that instead of LPC analysis and filtering as illustrated in FIG. 11, any other suitable spectral shaping technique such as subband coding or bandpass filtering can be used.

A power control circuit (not shown) such as power estimate and control circuit 96 of FIG. 5 can be used in the encoder of FIG. 11 to control the power of all of the auxiliary information signals as a group at the output of LPC synthesis filter 266. Such a power control circuit will enable the combined auxiliary information signals to be added to the primary data signal at a desired level, e.g., at a particular level below or above an acceptable interference threshold.

The combined signals provided by either of the encoders illustrated in FIGS. 10 and 11 can be recovered using a decoder of the type illustrated in FIG. 6. The decoder of FIG. 6 includes a selection control 128 that provides PN generator 118 with the necessary PN sequence to recover a desired one of the auxiliary information signals. For example, if it is desired to recover the auxiliary information input to terminal 290 of FIG. 11, selection control 128 of FIG. 6 will provide PN generator 118 with the information necessary to generate pseudorandom sequence PN$_2$, which is the sequence output by PN generator 294 in the encoder of FIG. 11.

Figure 12:
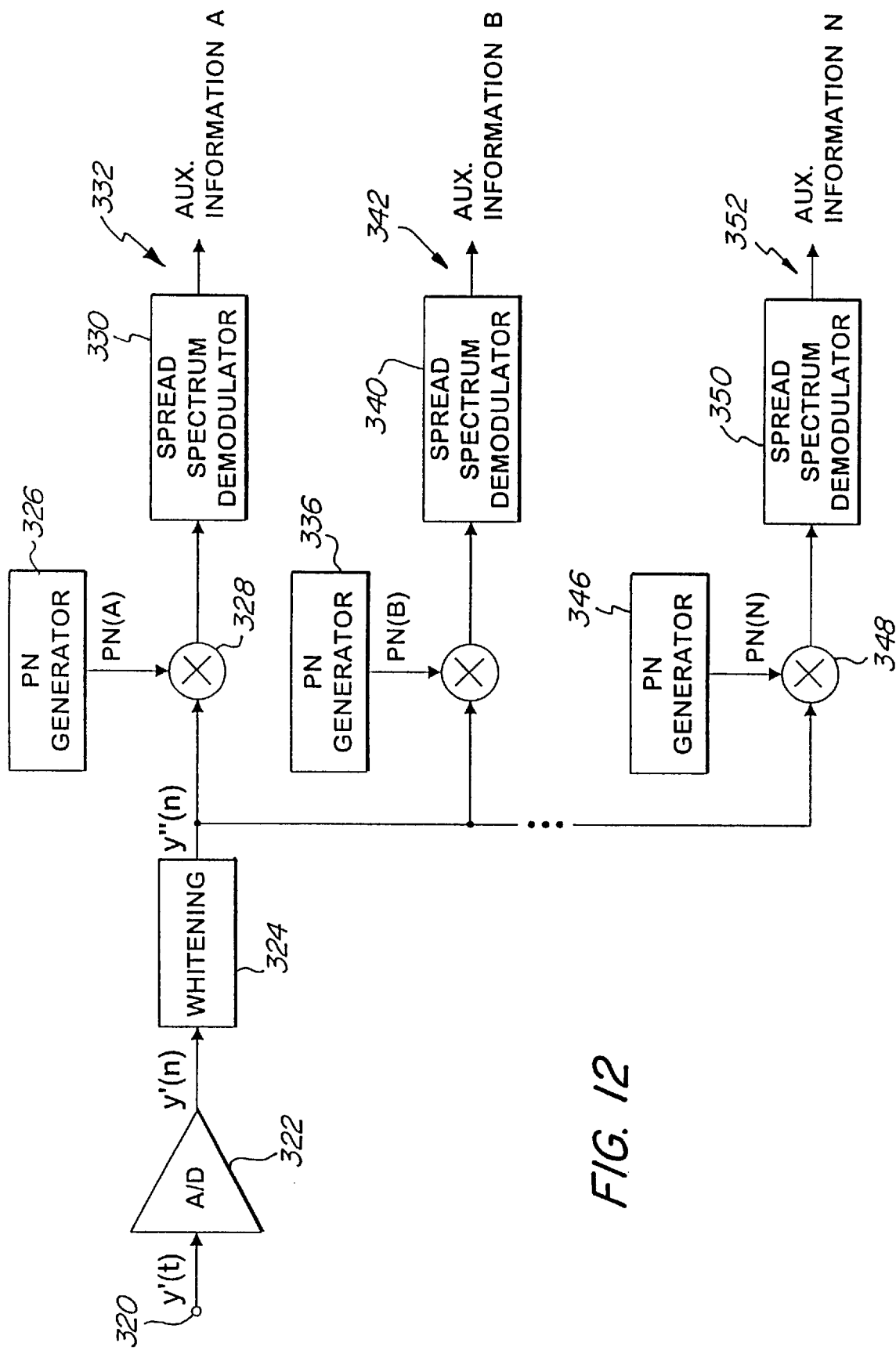
FIG. 12 is a block diagram of a decoder for simultaneously decoding a plurality of different auxiliary information signals embedded in a primary data signal.

FIG. 12 shows an embodiment wherein the decoder of FIG. 6 is modified to simultaneously decode a plurality of auxiliary information signals carried by the primary data signal. More particularly, the decoder of FIG. 12 receives, via terminal 320, the primary data signal having the auxiliary information signals hidden thereon as colored noise. If necessary, the input signal y'(t) is converted to the digital domain by an A/D converter 322. The resultant signal y'(n) is whitened using any available technique such as LPC analysis and prediction as shown by elements 114 and 116 in FIG. 6, by subband coding as illustrated by FFT processors 196, 198 and 202 of FIG. 9, by providing banks of bandpass filters for frequency filtering within the primary data signal bandwidth, or by any other suitable spectral shaping or filtering scheme. The decoder of FIG. 12 includes a plurality of stages 332, 342, 352, each receiving the whitened input signal y"(n). Each stage includes a PN generator (326, 336, 346) for recovering one of the plurality of auxiliary information signals. The PN generators can differentiate among the signals using any of a variety of techniques. For example, a different PN sequence can be used for each auxiliary information signal or different PN rates could be used to differentiate the signals. If the same PN rate is used for the different auxiliary information signals, then the PN sequences used will preferably all be orthogonal with respect to each other to facilitate signal differentiation and recovery.

The PN sequence output from each PN generator is input to a respective multiplier 328, 338, 348 that also receives the whitened primary data signal y"(n). The resultant output from each multiplier is input to a respective spread spectrum demodulator 330, 340 and 350 that outputs the corresponding auxiliary information signal. More particularly, stage 332 outputs auxiliary information signal "A" recovered using PN sequence PN(A), stage 342 outputs auxiliary information signal "B" using sequence PN(B), and stage 352 outputs auxiliary information signal "N" using sequence PN(N). The demodulators 330, 340 and 350 can comprise any suitable spread spectrum demodulator, such as the equivalent of "integrate and dump" components 122 and 124 shown in FIG. 6. Any required further processing of the signals output from the demodulators, such as FEC decoding, will be provided in a conventional manner.

The various other encoders and decoders illustrated in the figures can be similarly modified to handle multiple data streams embedded on one primary data signal. For example, the encoder of FIG. 3 can be provided with a plurality of stages, each comprising a separate PN generator 48, multiplier 46 and if necessary, A/D converter 50, for outputting different auxiliary information streams to combiner 52. Any required A/D conversion could alternatively be provided after the combiner. The decoder of FIG. 4 would be provided with a plurality of corresponding stages each having a PN generator 66, multiplier 64 and integrate and dump stage 68 for recovering the different auxiliary information signals carried with the primary data signal. Any necessary gain and power control components would also be included in the various encoder stages to provide the auxiliary information signals at the desired level(s) within the primary data signal.

It should now be appreciated that the present invention provides methods and apparatus for transporting auxiliary information in virtually any type of primary data signal. The auxiliary information is transported as colored noise, which is spectrally shaped to simulate the spectral shape of the primary data signal. The spectral shaping can be provided by any number of means, including LPC filtering and subband coding techniques.

PN generators can be used to provide the auxiliary information in the form of spread spectrum signals that are subsequently spectrally shaped. However, note that the auxiliary data signals need not be spread spectrum signals. Additionally, in any of the embodiments discussed herein, the auxiliary data signal may further be power adjusted, either before or after being spectrally shaped.

Moreover, the power of the auxiliary data signal can be further compensated to account for a cross-correlation between the primary data signal and the auxiliary data signal to enhance the recovery of the auxiliary data at a decoder.

Furthermore, in order to provide for the secure transmission of the auxiliary information, the PN generators can be keyed cryptographically, so that the counterpart PN sequence cannot be generated at a decoder without the corresponding cryptographic key. Moreover, a specific application for copy-protection of audio signals has been discussed.

Although the invention has been disclosed in connection with various specific embodiments, it will be appreciated by those skilled in the art that numerous adaptations and modifications may be made thereto without departing from the spirit and scope of the invention as set forth in the claims.

What is claimed is:

1. A method for adjusting the power of an auxiliary data signal which is carried with a primary data signal, comprising the steps of:
providing a cross-term compensation signal which is indicative of a cross-correlation between said auxiliary data signal and said primary data signal; and
adjusting a power of said auxiliary data signal according to said cross-term compensation signal and a desired signal-to-noise ratio to provide said power as a fraction of a power of said primary data signal.

2. The method of claim 1, comprising the further step of:
limiting said cross-term compensation signal to a predetermined range.

3. The method of claim 1, comprising the further steps of:
determining an average amplitude of said primary data signal; and
adjusting the power of said auxiliary data signal according to said average amplitude.

4. The method of claim 1, comprising the further step of:
floor-limiting the power adjustment of said auxiliary data signal.

5. The method of claim 1, comprising the further steps of:
determining an average amplitude of said primary data signal; and
adjusting the power of said auxiliary data signal according to a product of said average amplitude and said desired signal-to-noise ratio.

6. The method of claim 5, comprising the further step of:
limiting a magnitude of said cross-term compensation signal to a magnitude of said product of said average amplitude and said desired signal-to-noise ratio.

7. The method of claim 1, wherein:
said auxiliary data signal is obtained by modulating a pseudorandom noise carrier by auxiliary information to provide a spread spectrum signal carrying said auxiliary information on a carrier portion thereof.

8. The method of claim 1, wherein:
said auxiliary data signal is modulated according to a binary phase-shift keying (BPSK) technique.

9. The method of claim 1, comprising the further step of:
spectrally shaping said auxiliary data signal according to a spectral shape of said primary data signal.

10. The method of claim 9, comprising the further steps of:
performing time domain analysis of said primary data signal; and
performing time domain synthesis responsive to said time domain analysis to provide a synthesis filter;
wherein said spectrally shaping step comprises the step of filtering said auxiliary data signal using said synthesis filter.

11. The method of claim 9, comprising the further steps of:
performing frequency domain analysis of said primary data signal; and
performing frequency domain synthesis responsive to said frequency domain analysis to provide a synthesis filter;
wherein said spectrally shaping step comprises the step of filtering said auxiliary data signal using said synthesis filter.

12. The method of claim 1, wherein:
said primary data signal comprises audio data; and
said desired signal-to-noise ratio is provided such that said auxiliary data signal is carried substantially inaudibly in said primary data signal.

13. An apparatus for adjusting the power of an auxiliary data signal which is carried with a primary data signal, comprising:
cross-term compensation (CTC) calculation means for providing a cross-term compensation signal which is indicative of a cross-correlation between said auxiliary data signal and said primary data signal; and
a power adjuster for adjusting the power of said auxiliary data signal according to said cross-term compensation signal.

14. The apparatus of claim 13, further comprising:
limiting means for limiting said cross-term compensation signal to a predetermined range.

15. The apparatus of claim 13, further comprising:
an average amplitude estimation means for determining an average amplitude of said primary data signal; wherein:
said power adjuster is responsive to said average amplitude estimation means for adjusting the power of said auxiliary data signal according to said average amplitude.

16. The apparatus of claim 13, further comprising:
a floor limiter for floor-limiting the power adjustment of said auxiliary data signal.

17. The apparatus of claim 13, further comprising:
an average amplitude estimation means for determining an average amplitude of said primary data signal;
a multiplier for determining a product of said average amplitude and a desired signal-to-noise ratio of said auxiliary data signal in said primary data signal; wherein:
said power adjuster is responsive to said multiplier for adjusting the power of said auxiliary data signal according to said product.

18. The apparatus of claim 17, wherein:
said cross-term compensation calculation means limits a magnitude of said cross-term compensation signal to a magnitude of said product of said average amplitude and said desired signal-to-noise ratio.

19. The apparatus of claim 13, further comprising:

a modulator for modulating a pseudorandom noise carrier by auxiliary information to provide said auxiliary data signal as a spread spectrum signal carrying said auxiliary information on a carrier portion thereof.

20. The apparatus of claim 13, wherein:

said auxiliary data signal is modulated according to a binary phase-shift keying (BPSK) technique.

21. The apparatus of claim 13, further comprising:

means for spectrally shaping said auxiliary data signal according to a spectral shape of said primary data signal.

22. The apparatus of claim 21, further comprising:

means for performing time domain analysis of said primary data signal; and means for performing time domain synthesis responsive to said time domain analysis to provide a synthesis filter;

wherein said spectrally shaping means comprises said synthesis filter for filtering said auxiliary data signal to provide said spectral shaping thereof.

23. The apparatus of claim 21, further comprising:

means for performing frequency domain analysis of said primary data signal; and means for performing frequency domain synthesis responsive to said frequency domain analysis to provide a synthesis filter;

wherein said spectrally shaping means comprises said synthesis filter for filtering said auxiliary data to provide said spectral shaping thereof.

24. The apparatus of claim 13, wherein:

said primary data signal comprises audio data; and said auxiliary data signal is carried substantially inaudibly in said primary data signal.

25. The method of claim 1, wherein:

said auxiliary data signal comprises information indicative of a content of said primary data signal.

26. The method of claim 1, wherein:

said auxiliary data signal comprises information for effecting a copy protection scheme for said primary data signal.

27. The method of claim 1, wherein:

said auxiliary data signal is provided as white noise in said primary data signal.

28. The apparatus of claim 13, wherein:

said auxiliary data signal comprises information indicative of a content of said primary data signal.

29. The apparatus of claim 13, wherein:

said auxiliary data signal comprises information for effecting a copy protection scheme for said primary data signal.

30. The apparatus of claim 13, wherein:

said auxiliary data signal is provided as white noise in said primary data signal.

31. The apparatus of claim 13, wherein:

said power adjuster adjusts the power of said auxiliary data signal according to a desired signal-to-noise ratio to provide the power of said auxiliary data signal as a fraction of a power of said primary data signal.

32. A method for adjusting the power of an auxiliary data signal which is carried with a primary data signal, comprising the steps of:

providing a cross-term compensation signal which is indicative of a cross-correlation between said auxiliary data signal and said primary data signal;

adjusting a power of said auxiliary data signal according to said cross-term compensation signal; and limiting said cross-term compensation signal to a predetermined range.

33. A method for adjusting the power of an auxiliary data signal which is carried with a primary data signal, comprising the steps of:

providing a cross-term compensation signal which is indicative of a cross-correlation between said auxiliary data signal and said primary data signal;

determining an average amplitude of said primary data signal; and adjusting a power of said auxiliary data signal according to said cross-term compensation signal and said average amplitude.

34. A method for adjusting the power of an auxiliary data signal which is carried with a primary data signal, comprising the steps of:

providing a cross-term compensation signal which is indicative of a cross-correlation between said auxiliary data signal and said primary data signal;

adjusting a power of said auxiliary data signal according to said cross-term compensation signal; and floor-limiting the power adjustment of said auxiliary data signal.

35. A method for adjusting the power of an auxiliary data signal which is carried with a primary data signal, comprising the steps of:

providing a cross-term compensation signal which is indicative of a cross-correlation between said auxiliary data signal and said primary data signal;

determining an average amplitude of said primary data signal; and adjusting the power of said auxiliary data signal according to a product of said average amplitude and a desired signal-to-noise ratio, and according to said cross-term compensation signal.

36. The method of claim 35, comprising the further step of:

limiting a magnitude of said cross-term compensation signal to a magnitude of said product of said average amplitude and said desired signal-to-noise ratio.

37. A method for adjusting the power of an auxiliary data signal which is carried with a primary data signal, comprising the steps of:

providing a cross-term compensation signal which is indicative of a cross-correlation between said auxiliary data signal and said primary data signal;

adjusting a power of said auxiliary data signal according to said cross-term compensation signal; and spectrally shaping said auxiliary data signal according to a spectral shape of said primary data signal.

38. An apparatus for adjusting the power of an auxiliary data signal which is carried with a primary data signal, comprising:

a cross-term compensation (CTC) calculator; and a power adjuster associated with said CTC calculator; wherein:

said CTC calculator provides a cross-term compensation signal which is indicative of a cross-correlation between said auxiliary data signal and said primary data signal; and said power adjuster adjusts a power of said auxiliary data signal according to said cross-term compensation signal, and according to a desired signal-to-noise ratio to provide the power of said auxiliary data signal as a fraction of a power of said primary data signal.

39. The apparatus of claim 38, further comprising:

a limiter operatively associated with said CTC calculator;

said limiter being adapted to limit said cross-term compensation signal to a predetermined range.

40. The apparatus of claim 38, further comprising:

an estimator operatively associated with said CTC calculator;

said estimator being adapted to determine an average amplitude of said primary data signal; wherein:
said power adjuster is responsive to said estimator for adjusting the power of said auxiliary data signal according to said average amplitude.

41. The apparatus of claim 38, further comprising:

a floor limiter operatively associated with said CTC calculator;

said floor limited being adapted to floor-limit the power adjustment of said auxiliary data signal.

42. The apparatus of claim 38, further comprising:

an estimator operatively associated with said CTC calculator;

said estimator being adapted to determine an average amplitude of said primary data signal; and a multiplier coupled to said estimator; wherein:
said multiplier is adapted to determine a product of said average amplitude and said desired signal-to-noise ratio; and
said power adjuster is responsive to said multiplier for adjusting the power of said auxiliary data signal according to said product.

43. The apparatus of claim 42, wherein:

said CTC calculator is adapted to limit a magnitude of said cross-term compensation signal to a magnitude of said product of said average amplitude and said desired signal-to-noise ratio.

44. The apparatus of claim 38, further comprising:

a modulator coupled to said second terminal;

said modulator being adapted to modulate said carrier by auxiliary information to provide said auxiliary data signal as a spread spectrum signal carrying said auxiliary information;

wherein said carrier is a pseudorandom noise carrier.

45. The apparatus of claim 38, wherein:

said auxiliary data signal is modulated according to a binary phase-shift keying (BPSK) technique.

46. The apparatus of claim 38, further comprising:

a shaping filter coupled to said first and second terminal;

said shaping filter being adapted to spectrally shape said auxiliary data signal according to a spectral shape of said primary data signal.

47. The apparatus of claim 46, further comprising:

means coupled to said first terminal for performing time domain analysis of said primary data signal; and means for performing time domain synthesis responsive to said time domain analysis to provide a synthesis filter;

wherein said shaping filter comprises said synthesis filter for filtering said auxiliary data signal to provide said spectral shaping thereof.

48. The apparatus of claim 46, further comprising:

means coupled to said first terminal for performing frequency domain analysis of said primary data signal; and means for performing frequency domain synthesis responsive to said frequency domain analysis to provide a synthesis filter;

wherein said shaping filter comprises said synthesis filter for filtering said auxiliary data to provide said spectral shaping thereof.

49. The apparatus of claim 38, wherein:

said primary data signal comprises audio data; and said desired signal-to-noise ratio is provided such that said auxiliary data signal is carried substantially inaudibly in said primary data signal.

50. The apparatus of claim 38, wherein:

said auxiliary data signal comprises information indicative of a content of said primary data signal.

51. The apparatus of claim 38, wherein:

said auxiliary data signal comprises information for effecting a copy protection scheme for said primary data signal.

52. The apparatus of claim 38, wherein:

said auxiliary data signal is provided as white noise in said primary data signal.

* * * * *